United States Patent
Yu

(10) Patent No.: US 7,914,027 B2
(45) Date of Patent: Mar. 29, 2011

(54) ROCKER PROPELLED SCOOTER

(75) Inventor: Long Yu, Dalian (CN)

(73) Assignee: M.Y. Products, LLC, Greenwood, IN (US)

( * ) Notice: Subject to any disclaimer, the term of this patent is extended or adjusted under 35 U.S.C. 154(b) by 110 days.

(21) Appl. No.: 12/359,350

(22) Filed: Jan. 26, 2009

(65) Prior Publication Data

US 2010/0187790 A1 Jul. 29, 2010

(51) Int. Cl.
*B62M 1/00* (2010.01)
(52) U.S. Cl. ........ 280/221; 280/258; 280/252; 74/594.1
(58) Field of Classification Search .................. 280/221, 280/258, 220, 252; 74/594.1, 594.2
See application file for complete search history.

(56) References Cited

U.S. PATENT DOCUMENTS

| | | | | |
|---|---|---|---|---|
| 1,237,969 A * | 8/1917 | Stocks | | 280/251 |
| 2,723,131 A | 11/1955 | McChesney, Jr. | | |
| 3,175,844 A | 3/1965 | Whitehouse | | |
| 3,180,656 A | 4/1965 | Gruenstein | | |
| 3,415,540 A * | 12/1968 | Portnoff | | 280/221 |
| 3,992,029 A | 11/1976 | Washizawa et al. | | |
| 4,124,222 A | 11/1978 | Moe et al. | | |
| 4,186,934 A * | 2/1980 | Collings | | 280/221 |
| 5,192,089 A * | 3/1993 | Taylor | | 280/221 |
| 6,419,251 B1 * | 7/2002 | Chueh | | 280/221 |
| 6,705,630 B1 * | 3/2004 | Karpman | | 280/253 |
| 7,044,488 B1 * | 5/2006 | Hamend | | 280/221 |
| 7,635,136 B2 * | 12/2009 | Cole | | 280/87.042 |
| 2003/0098566 A1 * | 5/2003 | Christensen et al. | | 280/221 |
| 2004/0036249 A1 * | 2/2004 | McGuire et al. | | 280/253 |
| 2006/0038373 A1 * | 2/2006 | von Detten | | 280/221 |
| 2007/0063478 A1 * | 3/2007 | Kwok et al. | | 280/287 |
| 2010/0001487 A1 * | 1/2010 | Pang | | 280/221 |

FOREIGN PATENT DOCUMENTS

| | | |
|---|---|---|
| CN | 2475654 Y | 2/2002 |
| JP | 00940604 B | 1/1979 |
| JP | 07-329863 A | 12/1995 |
| JP | 03-073161 U9 | 8/2000 |
| KR | 10-1980-0000469 B1 | 5/1980 |
| KR | 20-0412875 Y1 | 4/2006 |

OTHER PUBLICATIONS

Sport Fusion website; http://www.sportfusion.co.uk/p/1577/Atomic-Sports-Scooters/Rock-IT-Scooter.html; Rock-It Scooter At Sport Fusion.

Extreme Karts website; http://www.takeitout.co.uk/other-products/rock-it-scooter; Rock-It Scooter.

(Continued)

*Primary Examiner* — Joanne Sibermann
*Assistant Examiner* — Tashiana Adams
(74) *Attorney, Agent, or Firm* — Woodard Emhardt Moriarty McNett & Henry LLP

(57) ABSTRACT

A scooter having a rockable platform upon which the rider stands with both feet. The platform is attached by a chain to one-way sprocket wheels mounted to the scooter rear wheel rotating the rear wheel to propel the scooter in a forward direction as the front end of the platform moves and as the rear end portion of the platform moves down. The scooter has a position to allow the user to place one foot on the ground and one foot on the platform to propel the same.

14 Claims, 19 Drawing Sheets

OTHER PUBLICATIONS

FiveFWD website: http://fwd.five.tv/gadgets/lifestyle/travel/rock-it-scooter; Rock-It Scooter.
Youtube Website; http://www.youtube.com/watch?v=G717ohjh4Fg&feature=related; Rock-It-Scooter.

Notification of Transmittal of International Search Report related to PCT/US2009/053093.
Written Opinion of the International Searching Authority related to PCT/US2009/053093.

* cited by examiner

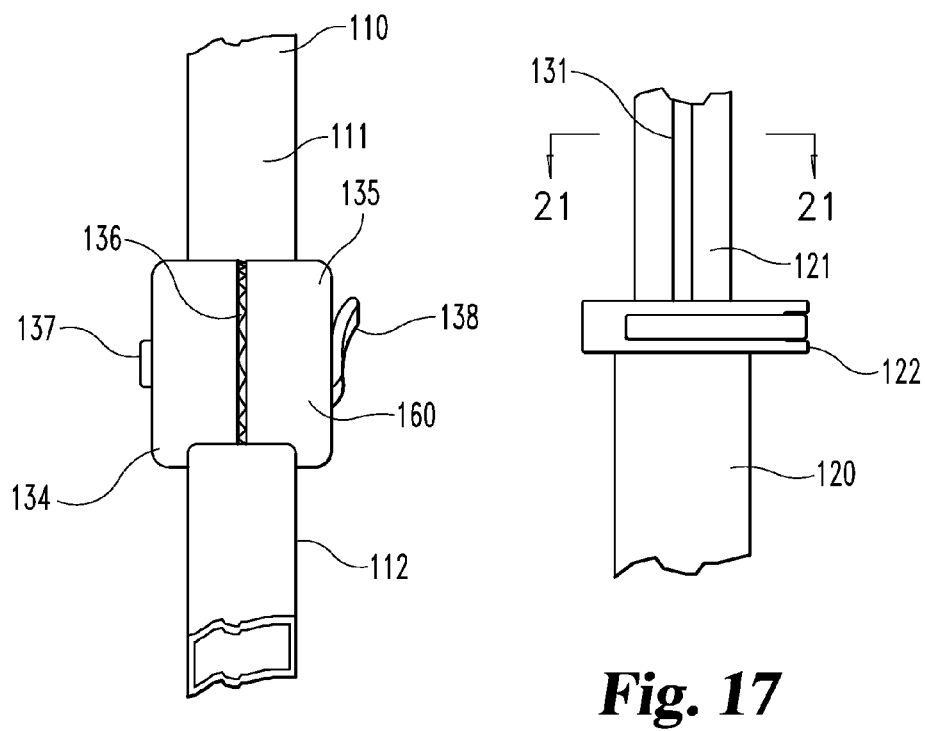
Fig. 16
Fig. 17
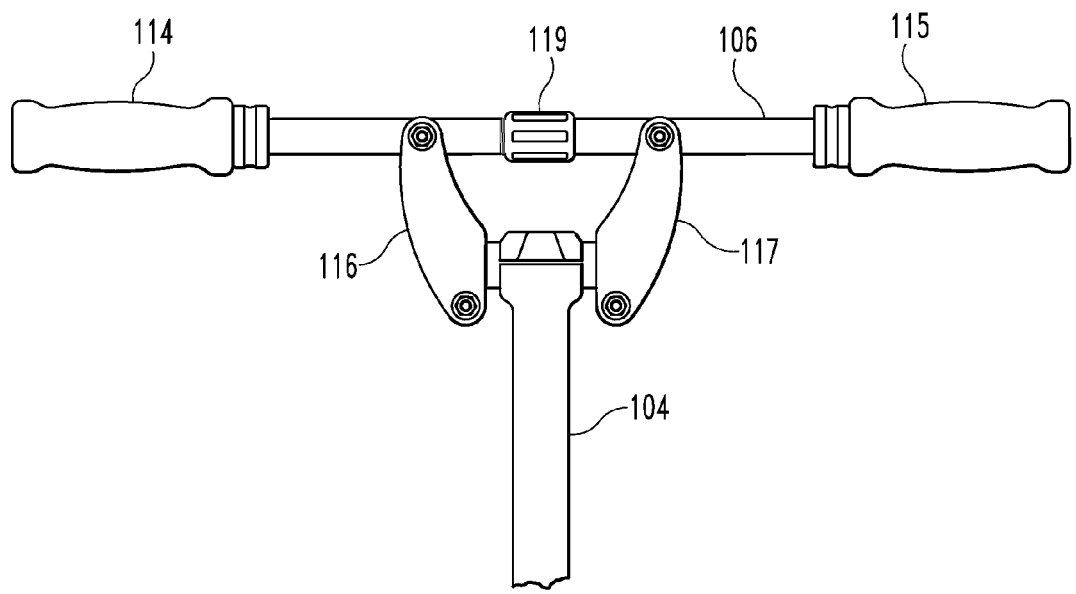
Fig. 18

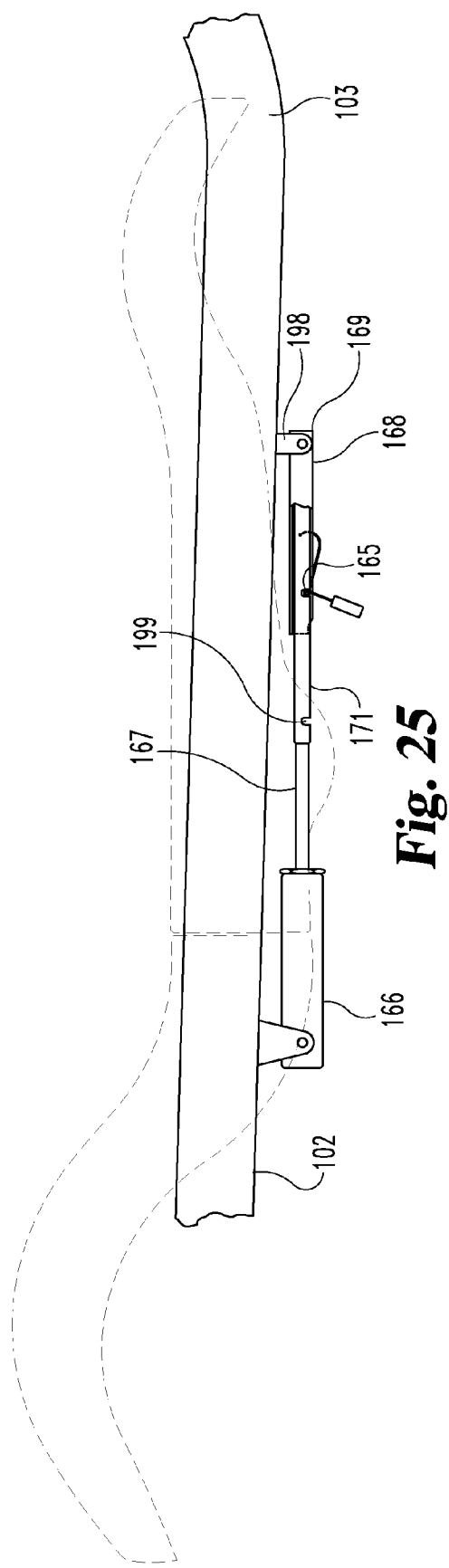

ROCKER PROPELLED SCOOTER

BACKGROUND OF THE INVENTION

1. Field of the Invention

The present invention relates generally to the field of scooters with a foot operated device for propelling the scooter.

2. Description of the Prior Art

Scooters are well known and are propelled forward by the rider having one foot on the scooter and the other foot moving along the ground to propel the scooter forward. A conventional and popular scooter is shown in FIG. 1 and generally includes a deck 70 with a rear wheel 72 and front wheel 71. A head tube 75 is connected to a connection mechanism 74. A handlebar stem 73 is rotatably mounted to the head tube 75 with the front wheel 71 rotatably mounted to the lower end of stem 73. A handlebar is mounted atop stem 73. The rider places one foot on deck 70 and the other foot on the ground to move the scooter forward. The foot on deck 70 often feels exhausted, because it has to bear the weight of the body and keep balance during moving. Most users use a specific foot on the deck 70 so that only one foot is exercised by kicking and pushing against the ground. Some people cannot operate the scooter properly because it requires good balance sense. As a result, some people do not prefer to use the scooter because only one leg is exercised, and it is inefficient and low speed. In general, the scooter is only suitable for flat or downhill road sections and as a result the use is limited.

Treadle scooters employ a movably mounted footplate which a person may force downwardly. The footplate is drivingly engaged with the rear wheel of the scooter thereby providing some forward movement of the scooter as the footplate is moved downward. A sample of treadable scooters are disclosed in the following U.S. Pat. No. 2,723,131 issued to McChesney, Jr.; U.S. Pat. No. 1,175,844 issued to Whitehouse; U.S. Pat. No. 3,180,656 issued to Gruenstein; and U.S. Pat. No. 4,124,222 issued to Moe et al. A further type of scooter having a reciprocating extending flexible member is disclosed in U.S. Pat. No. 3,992,029 issued to Washizawa et al.

Treadle scooters typically use a clutch ratchet wheel mechanism that transmits rotational force to the drive wheel when the foot pedal is moved down with the clutch disengaging the ratchet wheel from the wheel as the foot pedal moves up for the next cycle allowing the drive wheel to coast as the foot pedal moves up. As a result, wasted motion occurs in that continual movement of the foot pedal does not continually drive the rear wheel.

Treadle scooters require one foot of the rider to remain stationary while the other foot continually engages the foot pedal to drive the scooter. The result is awkward motion of the rider since one foot is stationary and the other foot is continually moving. A scooter that has a drive mechanism that will allow for the continual driving of the drive wheel while also allowing the user to have a balance motion when operating the drive mechanism is disclosed in FIGS. 2-7 and Chinese Patent CN2475654Y published Feb. 6, 2002.

SUMMARY OF THE INVENTION

A scooter may be propelled in a forward direction both in a first position by pushing the foot of the person against the ground while resting the other foot atop the scooter and in a second position by placing and rocking both feet atop the scooter. A frame has a first end portion and an opposite second end portion. A first wheel is rotatably mounted to the first end portion of the frame and a second wheel is rotatably mounted to the second end portion of the frame. A platform has a front end portion to support one foot of the person and a rear end portion to support the other foot of the person with the platform movably mounted to the frame between the front end portion and the rear end portion. The platform in the first position limits movement between the platform and the frame to receive the first foot atop the platform while the second foot engages the ground to propel the scooter. A ratchet means and a first connecting means is connected to the front end portion of the platform and the rear end portion of the platform with the ratchet means being operable to propel the scooter in a forward direction when the platform is rocked both by moving the front end portion and the rear end portion.

It is an object of the present invention to provide a new and improved scooter.

A further object of the present invention is to provide a scooter for riding in a balanced fashion while using the rider's feet to continually force the driven wheel in a forward direction while also allowing the scooter to be used in a conventional manner by resting one foot to engage the ground and push the scooter.

Related object and advantages of the present invention will be apparent from the following description.

BRIEF DESCRIPTION OF THE DRAWINGS

FIG. 16 is a fragmentary, enlarged, front view looking in the direction of arrow 16-16 of FIG. 15 showing the fastening components for releasably locking the handlebar stem in the upright position.

FIG. 17 is a fragmentary, enlarged, view looking in the direction of arrow 17-17 of FIG. 15 showing the fastening components for releasably locking the telescopic stem at the desired length.

FIG. 18 is a fragmentary, enlarged, front view looking in the direction of arrow 18-18 of FIG. 15 showing the handlebar.

FIG. 25 is a schematic view of the locking mechanism for releasably locking the scooter in the upright position of FIG. 14.

DESCRIPTION OF THE PREFERRED EMBODIMENT

Figure 1:
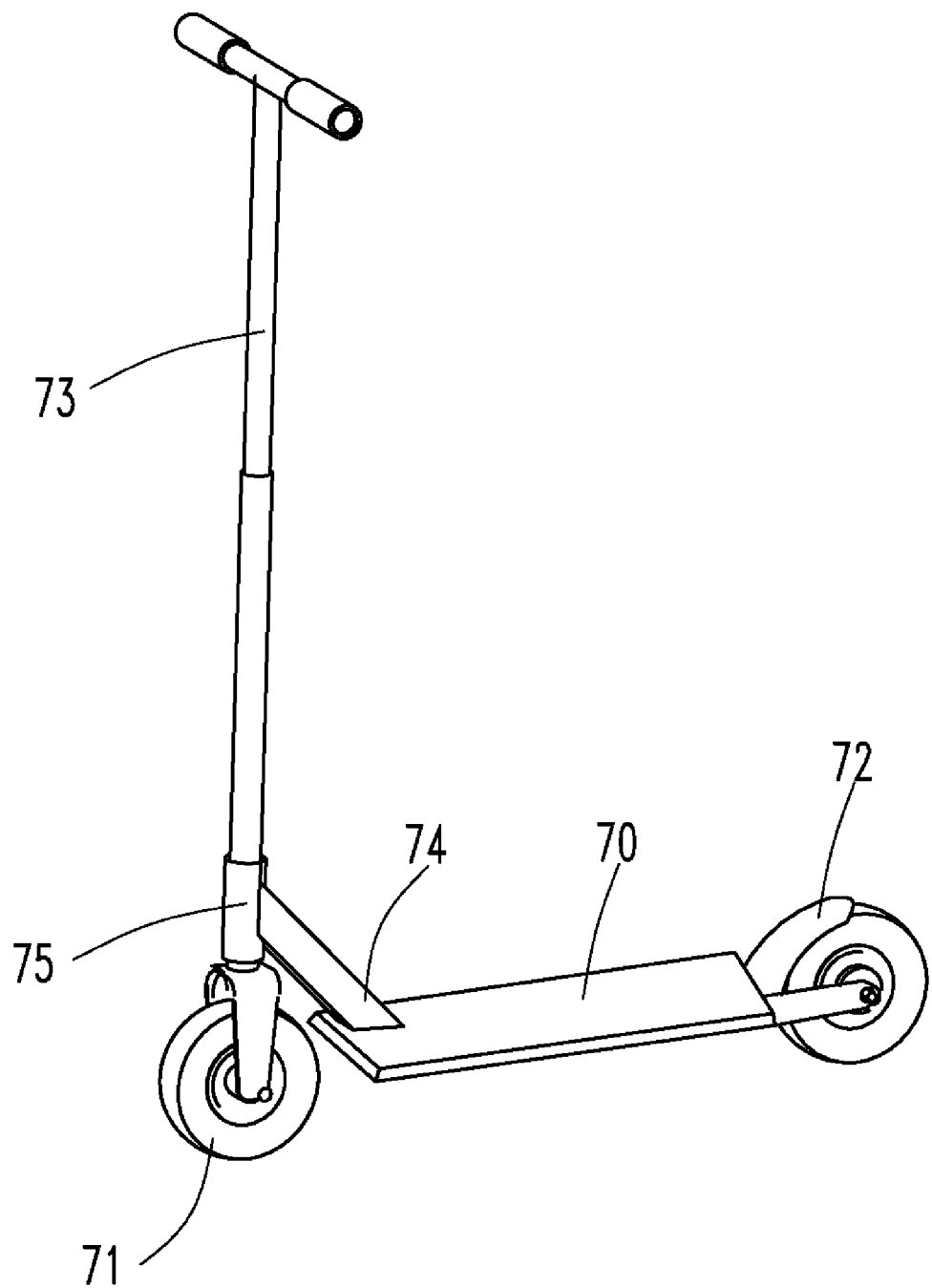
FIG. 1 is a perspective view of a prior art scooter.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

A prior art rocker propelled scooter 20 for a person with both feet thereatop includes a frame 21 having a pair of upwardly extending legs 22 and 23 (FIG. 2) joined together and pivotally connected by pin 24 to platform 25. The front end portion 26 of frame 21 is integrally attached to a hollow cylinder 27 through which stem 28 is rotatably mounted. Stem 28 includes a handlebar 29 for the rider to grasp. An inverted u-shaped bracket 30 is integrally mounted to the bottom end of stem 28 and rotatably receives front wheel 31 mounted thereto by axle 32. The rear end portion of frame 21 has a second wheel 33 rotatably mounted to the bottom end of portion 23 by axle 34.

Rocker platform 25 has a front end portion 35 to support one foot of the rider and a rear end portion 36 to support the other foot of the rider. The platform is pivotally mounted by pin 24 equidistant between end portions 35 and 36. Ratchet wheel means 39 is mounted to the rear wheel 33 and includes a pair of ratchets mounted to the opposite sides of wheel 33.

A first connecting means 37 is attached to the front 35 and rear 36 portions of platform 25 and, in turn, drivingly engages the opposite ratchets mounted to the rear wheel so that as platform 25 is rocked back and forth, rotational driving motion is imparted to wheel 33 to propel the scooter in the forward direction. A pulley wheel 38 is mounted to frame 21 beneath platform 25 and directs the connecting means 37 from one ratchet to the other ratchet and maintains the tension in the connecting means.

Figure 3:
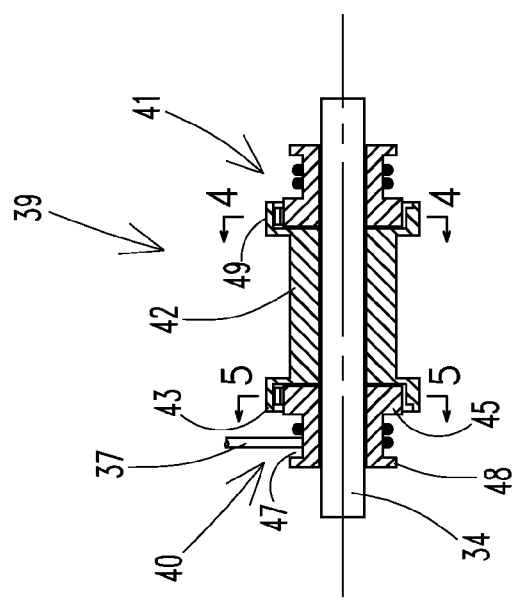
FIG. 3 is an enlarged cross-sectional view of the rear wheel taken along the line 3-3 of FIG. 2 and viewed in the direction of the arrows.

Ratchet wheel means 39 (FIG. 3) consists of a pair of commercially available ratchets 40 and 41 (FIG. 3) mounted to the opposite sides of wheel 33, in turn, rotatably mounted to axle 34. Each ratchet 40 and 41 is operable to drive the wheel when rotated in a first direction or disengaged from the wheel when rotated in an opposite direction. Thus, by rotating one ratchet wheel in a first direction while rotating the opposite ratchet wheel in an opposite direction, the wheel is caused to rotate imparting forward movement to the scooter. Alternatively, by reversing the rotation of the two ratchet wheels, continued rotational force is applied to the wheel.

Ratchet wheel means 39 includes a left ratchet 40 and a right ratchet 41 spaced apart by a hub 42 fixedly attached to the rear wheel 33 of the scooter. Hub 42 is rotatably mounted to axle 34. The outer opposite ends of hub 42 form recesses or outer races into which the inwardly facing ends of inner races 57 and 58 are rotatably mounted.

Hub 42 includes a first ring shaped outwardly extending and continuous flange 43 (FIG. 4) having a plurality of tooth shaped recesses 44 extending around the internal recess of flange 43. Inner race 57 has a disc shaped inwardly facing end 45 rotatably received in flange 43. End 45 has a plurality of spring biased ratchets or fingers 46 that are biased outwardly to engage the tooth shaped recesses 44. Fingers 46 and recesses 44 are shaped and oriented so that race 57 is allowed to freely rotate in one direction but prevented from rotating in the opposite direction since fingers 46 engage recesses 44. Thus, a one way ratchet is formed.

In the event a wire is used for connecting means 37, then the wire is wrapped on continuous recess 47 formed between the inner end 45 and outer end 48 of the inner race 57. On the other hand, if a chain is used in lieu of a wire for the connecting means 37, then sprocket teeth are used in lieu of recess 47. In other words, a plurality of teeth are formed to releasably engage the chain that wraps around inner race 48. In either event, the same rotational action is achieved regardless of whether a wire or chain is utilized for the connecting means. Similarly, hub 42 is provided with an outwardly facing end 49 having a plurality of inwardly extending tooth shaped recesses formed in the recess of flange 49 to engage the spring biased outwardly extending fingers provided in the disc shaped inner race 58.

Figure 6:
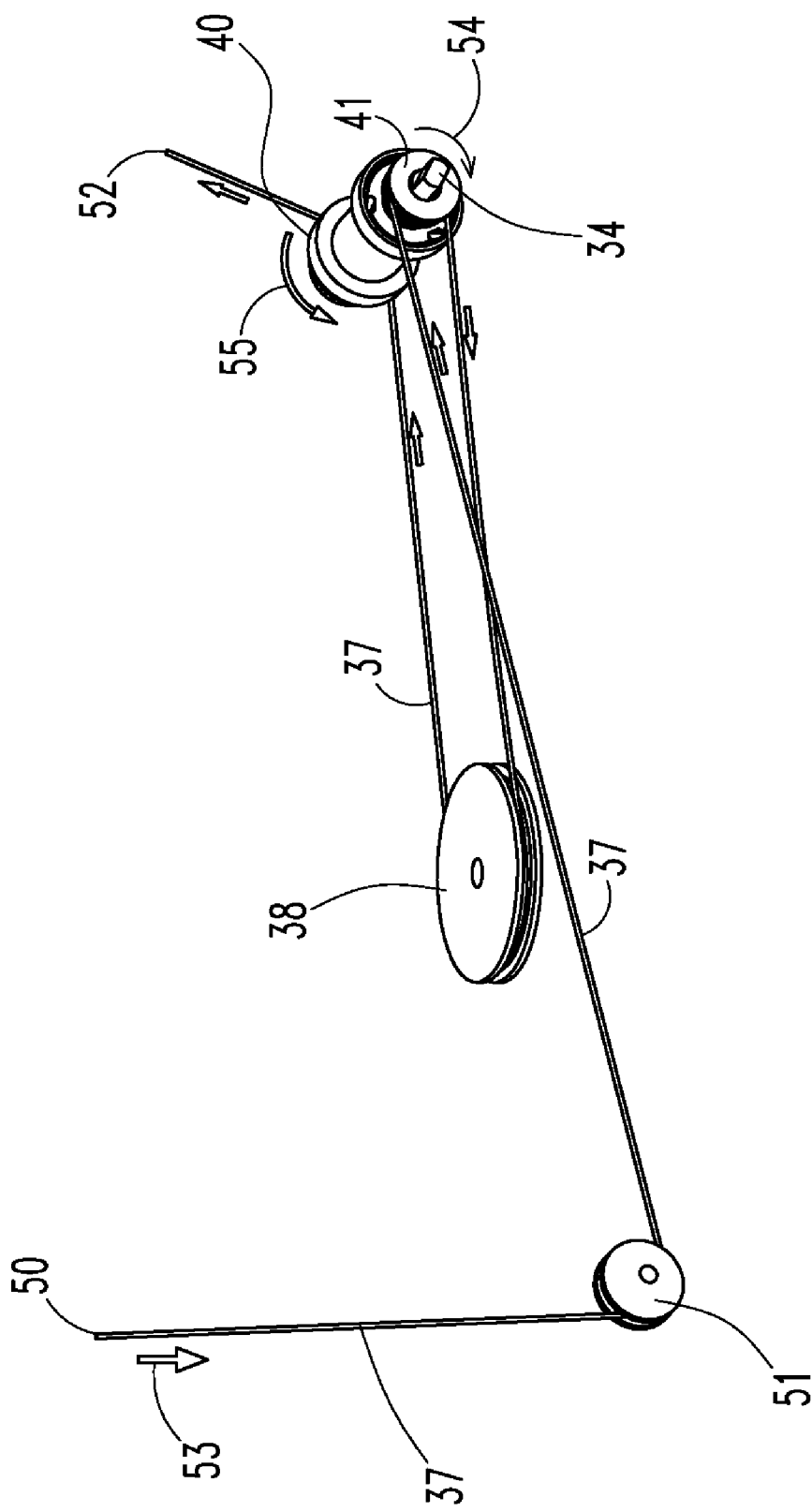
FIG. 6 is a schematic diagram illustrating the drive mechanism for the scooter of FIG. 2 corresponding to the front end of the foot platform moving downward.
Figure 7:
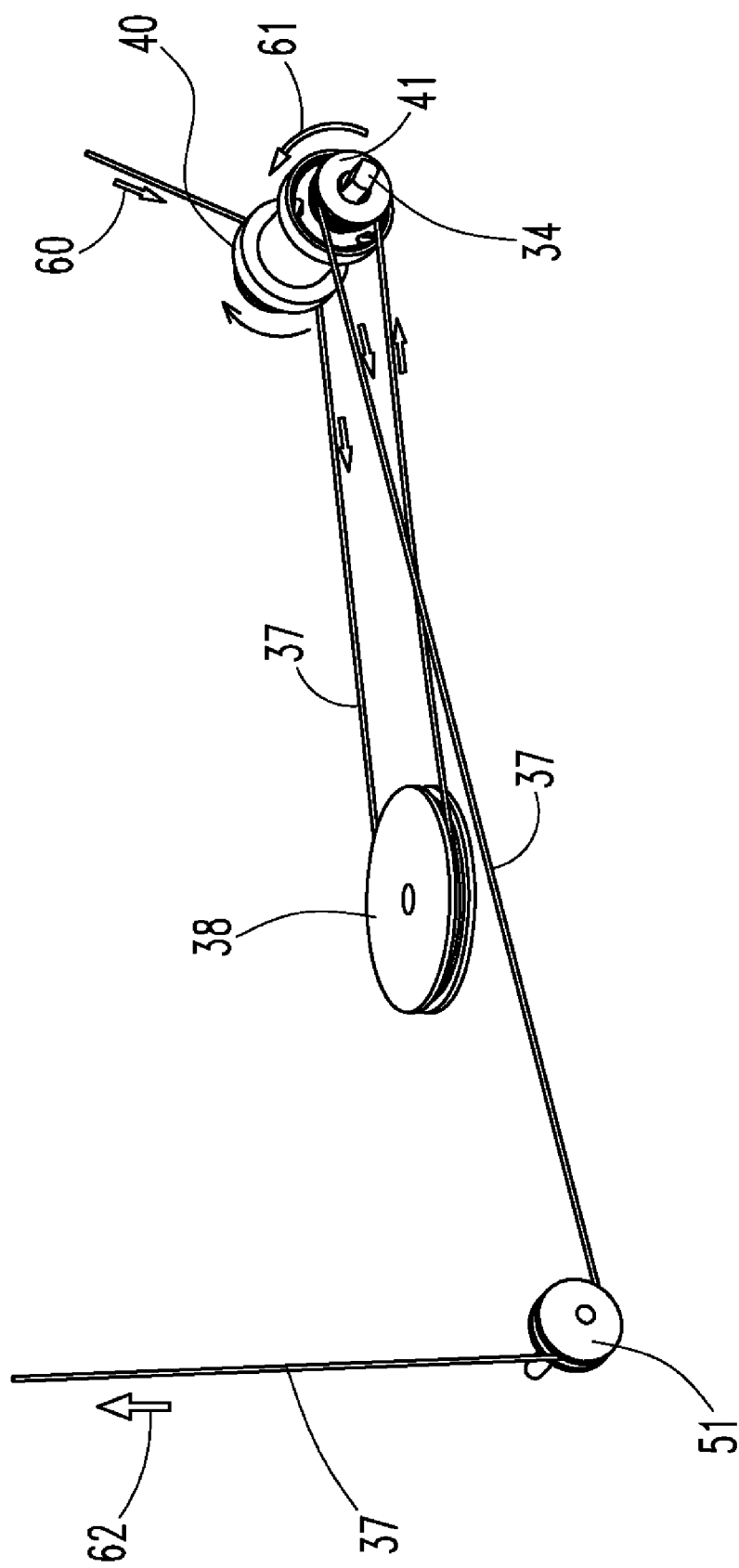
FIG. 7 is the same diagram as FIG. 6 only corresponding to the front end of the foot platform moving upward.

Connecting means 37 is connected to the opposite ends of platform 25 and is wrapped around the pair of inner races 57 and 58. FIGS. 6 and 7 depict the connecting means as a wire and illustrates when the front end of the platform is being forced downwardly with the result that the rear end portion of the platform is forced upwardly. FIG. 7 illustrates when the front end portion of the platform moves upwardly while the rear end portion of the platform is forced downwardly.

The connecting means or wire 37 has a top end 50 fixedly attached to the front end portion 35 of the platform. The wire extends downwardly around a conventional rotatably mounted wheel 51 mounted to arm 22 of frame 21. The wire then continues rearwardly where it wraps partially around ratchet 41 in a clockwise direction continuing on to wheel 38 mounted to the frame 21 beneath the platform. The wire continues again rearwardly where it extends, in a counterclockwise direction as viewed in FIG. 6, around ratchet 40 and then upwardly with the top end 52 of the wire fixedly attached to the rear end portion of the platform.

Figure 2:
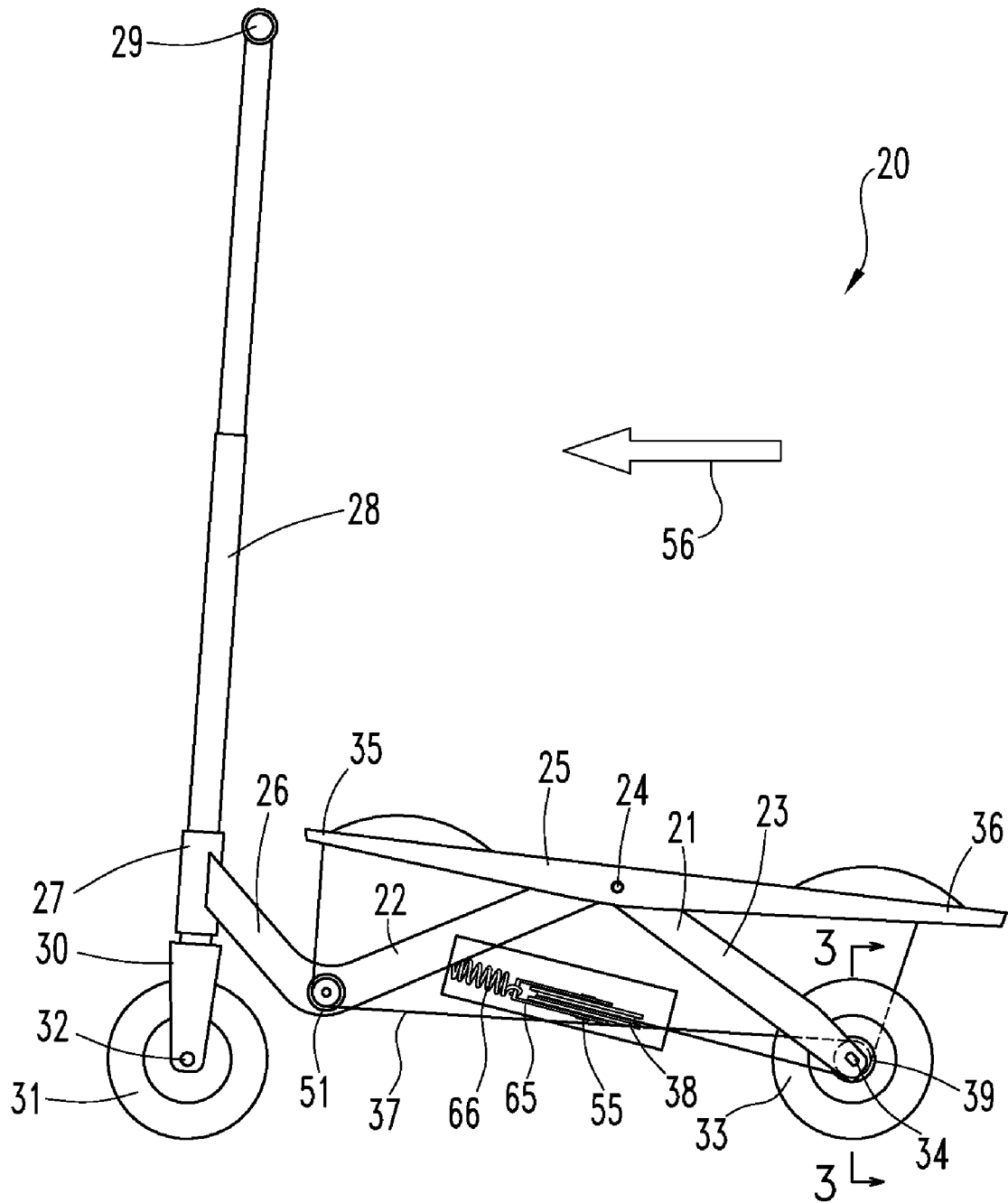
FIG. 2 is a side view of a prior art scooter having a foot operated drive mechanism.
Figure 5:
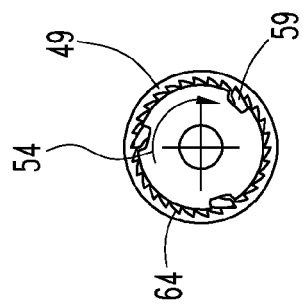
FIG. 5 is a cross-sectional view taken along the line 5-5 of FIG. 3 and viewed in the direction of the arrows.
Figure 4:
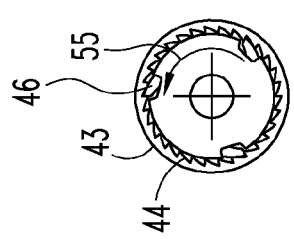
FIG. 4 is a cross-sectional view taken along the line 4-4 of FIG. 3 and viewed in the direction of the arrows.

In use, the rider of the scooter places one foot onto the front end of platform 25 and the other foot onto the back end portion of the platform and holds onto the handlebar. The rider then moves his or her feet up and down to move the platform like a seesaw. When the operator moves his front foot down and his back foot up, the front of the platform is forced downwardly as illustrated by the movement of wire 37 and FIG. 6 while the rear end portion of the platform moves upward. Referring to FIG. 6, as the front of the platform moves down, wire 37 moves in the direction of arrow 53 and then rearwardly rotating ratchet 41 in a clockwise direction. As ratchet 41 is rotated in a clockwise direction 54 (FIG. 5) the outwardly extending spring biased teeth 59 are allowed to move freely around the axle hub thereby not being lockingly engaged with recess 64. In other words, ratchet 41 is in a non-driving position. Wire 37 then extends forward around pulley wheel 38 and rearward around ratchet 40 in a counterclockwise direction causing ratchet 40 to also rotate in a counterclockwise direction 55 (FIGS. 4 and 5). The outwardly extending teeth 46 of the ratchet lockingly engage with recesses 44 thereby rotating ratchet 40 in a counterclockwise direction 55 causing wheel 33 to also move in a counterclockwise direction propelling the scooter in a forward direction 56 (FIG. 2). Wire 37 exits ratchet 40 and is pulled upwardly by the rearward extending platform to which it is attached as the front end portion of the platform is forced downwardly.

The opposite action occurs when the rearward end of the platform is forced downwardly while the upward portion of the platform moves upwardly as illustrated by the wire movement depicted in FIG. 7. Thus, as wire 37 moves downwardly in the direction of arrow 60, the wire extends partially around ratchet wheel 40 in a clockwise direction causing the ratchet wheel to rotate in a clockwise direction disengaging its outwardly extending teeth from the recess of flange 43 allowing ratchet 40 to freely spin. Wire 37 then extends forwardly around pulley 38 and rearwardly around ratchet 41 in a counterclockwise direction whose outwardly extending teeth are lockingly engaged with the inwardly formed tooth shaped recesses of flange 49 causing counterclockwise movement in the direction of arrow 61 thereby imparting counterclockwise rotation to wheel 33. Wire 37 extends forwardly and then upwardly in the direction of arrow 62 allowing the front end portion of the platform to move upwardly as the rear end portion of the platform is forced downwardly.

Pulley wheel 38 is rotatably mounted within pulley wheel housing 65 (FIG. 2), in turn, secured to frame 21 by a helical spring 66 having one end attached to the frame and the opposite end attached to the pulley wheel housing. The spring normally biases pulley wheel 38 so that tension is maintained in wire 31 between the opposite ratchets. The spring is yieldable to allow the pulley wheel to relax the tension on the wire or chain extending around the pulley wheel.

Figure 8:
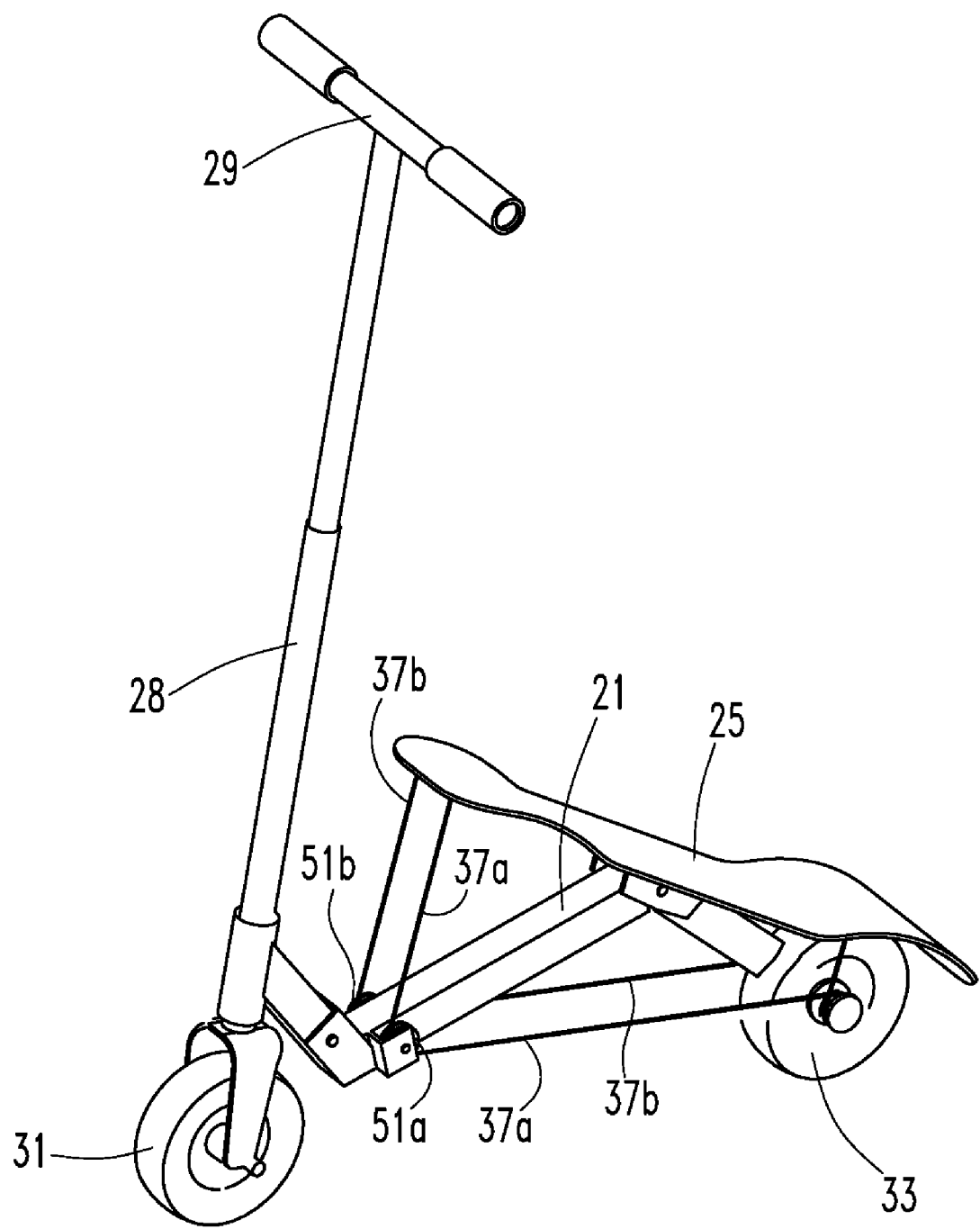
FIG. 8 is perspective view of another prior art scooter having a drive mechanism.
Figure 9:
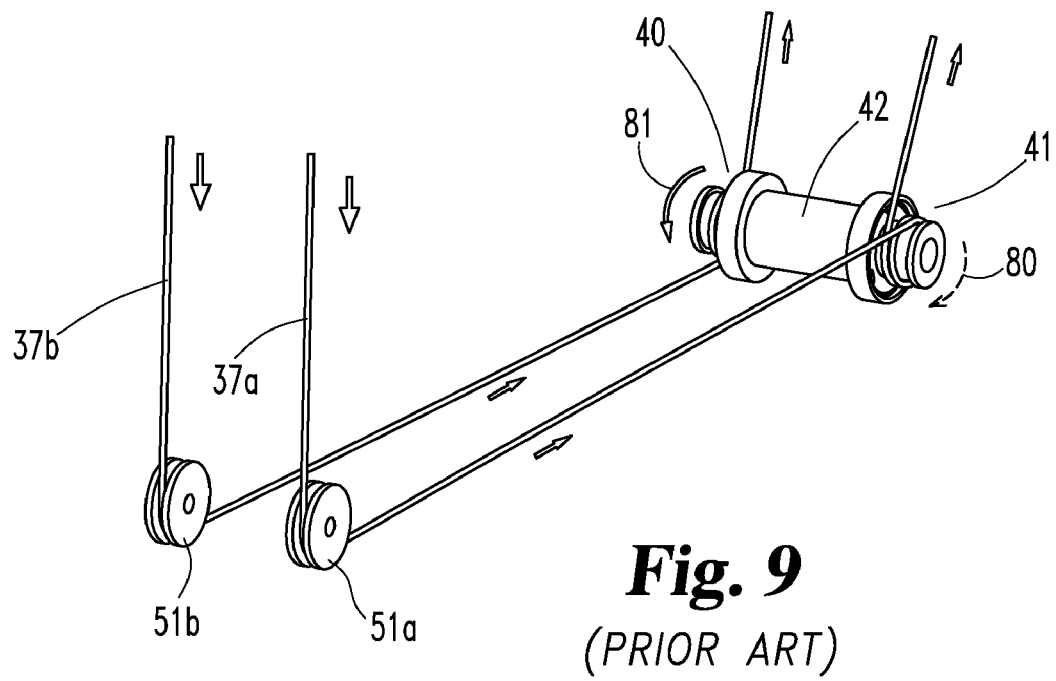
FIG. 9 is schematic diagram of the drive mechanism for the scooter of FIG. 8 corresponding to the front end of the foot platform moving downward.
Figure 10:
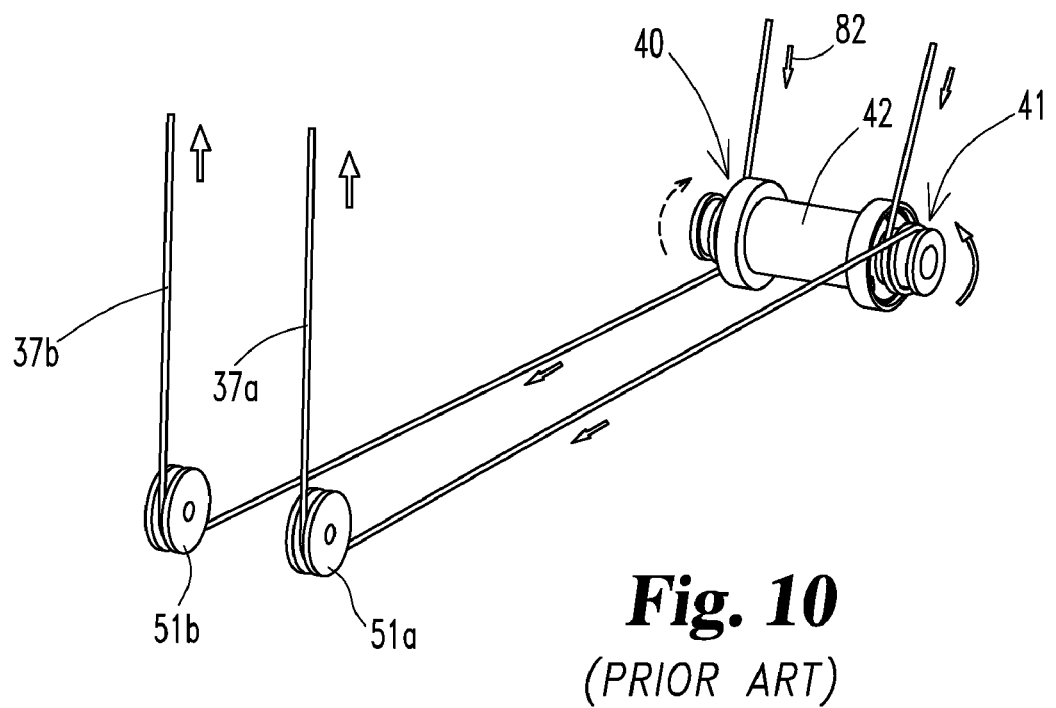
FIG. 10 is the same diagram as FIG. 9 only corresponding to the front end of the foot platform moving upward.
Figure 11:
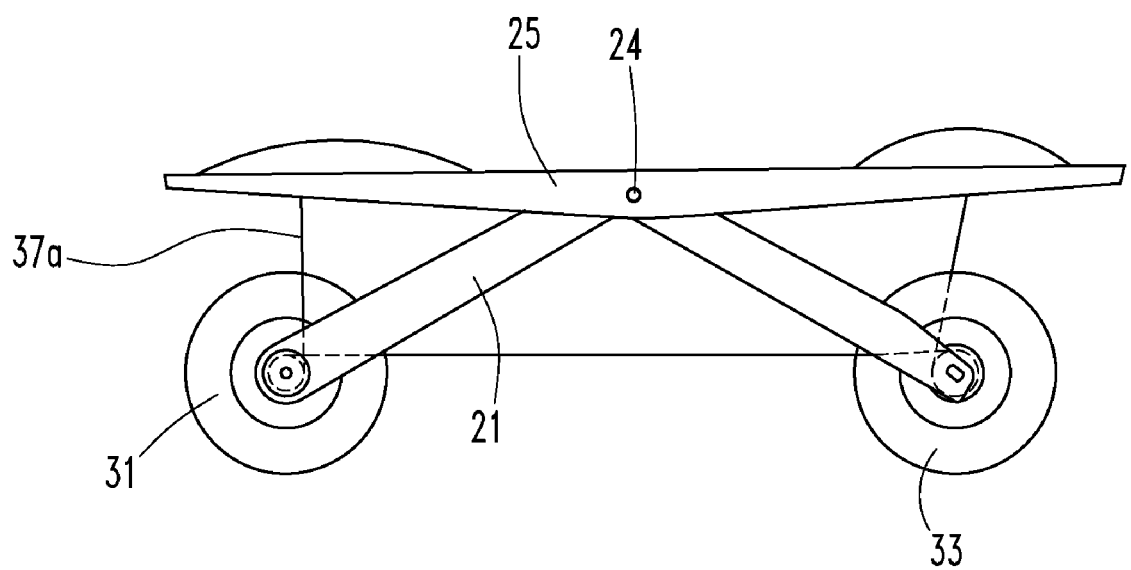
FIG. 11 is a side view of another prior art scooter having a drive mechanism.

Two prior art scooters are depicted in FIGS. 8 and 11. In FIG. 8, a pair of wires or chains are used to drive the rear ratchets mounted to the rear wheel 33. Pulley wheel 38 is not utilized. A pair of wheels 51a and 51b are rotatably mounted to frame 21 and receive the downwardly extending wires 37a and 37b having their top ends affixed to the front end portion of platform 25. The pair of wires then extend rearwardly and partially around the ratchets mounted to the opposite sides of the rear wheel 33 and then upwardly being attached to the rear end portion of the platform. FIGS. 9 and 10 illustrate respectively when the front end portion of the platform is forced downwardly and when the rear end portion of the platform is forced downwardly. Thus, wires 37a and 37b (FIG. 9) are moved downwardly as the front end of the platform moves down with both wires extending around wheels 51a and 51b and then extending rearwardly. Wire or chain 37a extends in a clockwise direction 80 (FIG. 9) around ratchet 41 and then upwardly to the rear end portion of the platform. Likewise, wire or chain 37b extends in a counterclockwise direction 81 as viewed in FIG. 9 around ratchet 40 and then upwardly. Ratchet 41 is therefore disengaged and is free to rotate whereas ratchet 40 is lockingly engaged with the wheel hub 42 causing the rear wheel 33 to rotate in a counterclockwise direction propelling the scooter in the forward direction of arrow 56 (FIG. 2). Likewise, as the rear end portion of the platform is forced downwardly (FIG. 10), wires 37a and 37b move downwardly in the direction of arrows 82 around the ratchets thereby causing ratchet 41 to be engaged with the hub while ratchet 40 is disengaged from the hub causing the rear wheel 33 to rotate in a counterclockwise direction propelling the scooter in the forward direction.

Figure 12:
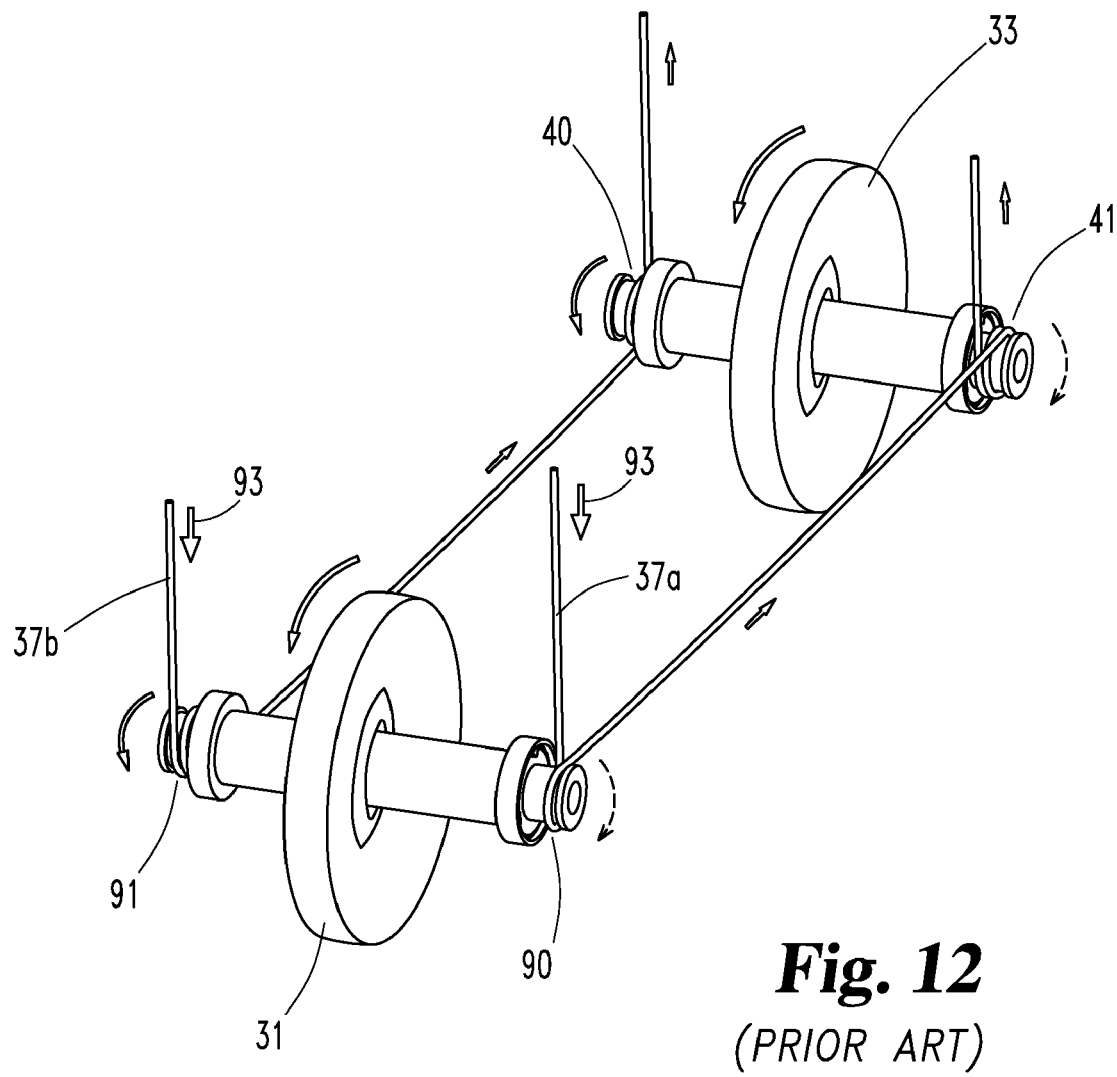
FIG. 12 is a schematic diagram of the drive mechanism for the scooter of FIG. 11 corresponding to the front end of the foot platform moving downward.
Figure 13:
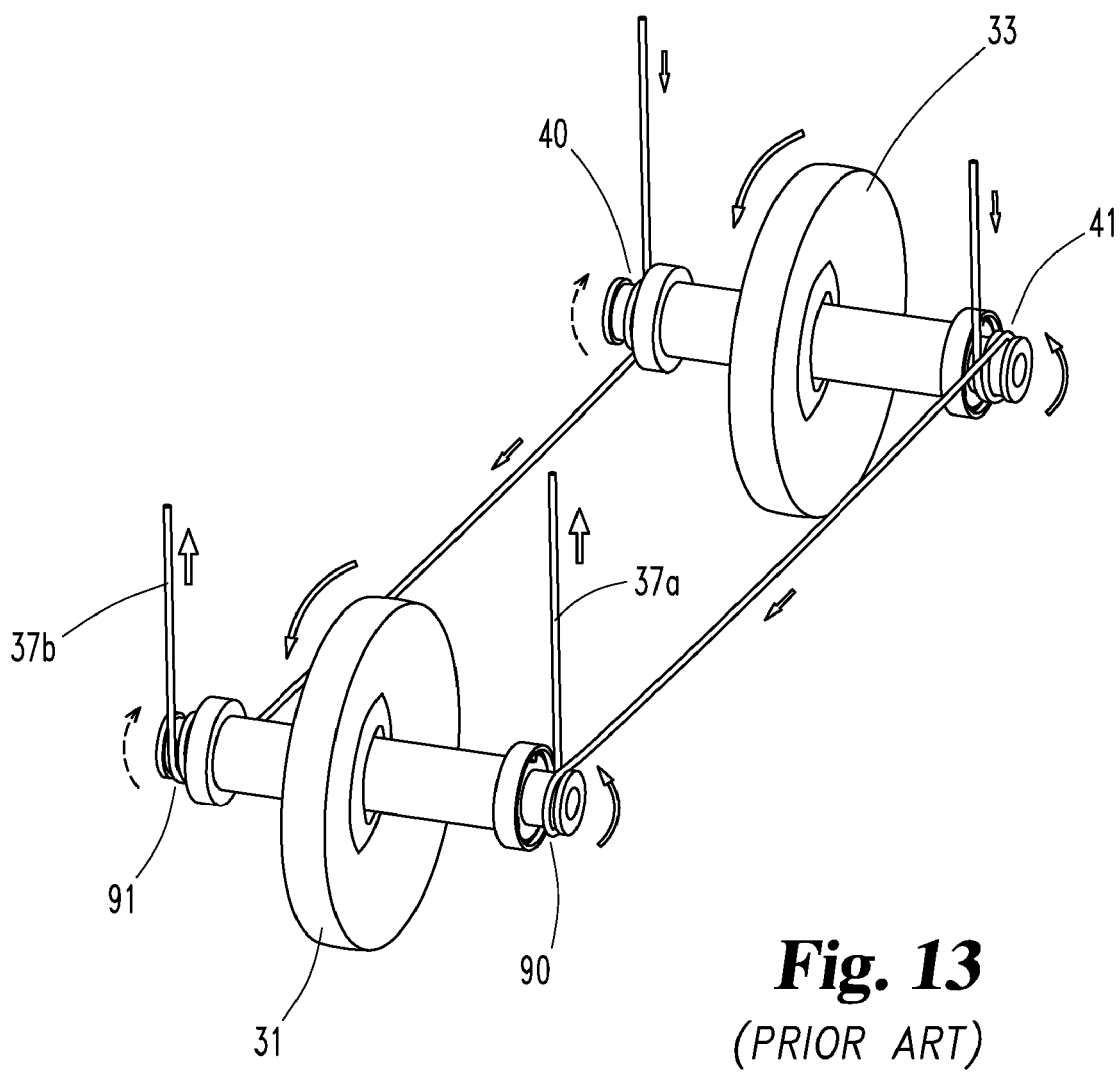
FIG. 13 is the same diagram as FIG. 12 only corresponding to the front end of the foot platform moving upward.

The embodiment depicted in FIGS. 11-13 is identical to the scooter depicted in FIG. 8 with the exception that a pair of ratchets are also mounted to the front wheel 31 of the scooter and with the exception that a handlebar and handlebar stem are not provided thereby requiring the rider to be balanced on the scooter without holding onto the handlebar. Thus, the scooter in FIG. 11 takes the general shape of a skateboard although the platform upon which the rider stands is pivotally mounted as illustrated and previously described for the embodiments disclosed herein.

FIGS. 12 and 13 show respectively the movement of the pair of wires or chains 37a and 37b when the front end of the platform is forced downwardly and when the rear end portion of the platform is forced downwardly. Referring to FIG. 12, wires 37a and 37b have top ends fixedly attached to the front end portion of platform 25. Ratchet 90 is constructed and placed on the front wheel in a manner identical to the construction and placement of ratchet wheel 41 on the rear wheel. Likewise, ratchet 91 is constructed and placed on the front wheel in a manner identical to the construction and placement of ratchet 40 on the rear wheel. Wire 37a extends in a clockwise direction as viewed in FIG. 12 around ratchet 90 and then rearward to ratchet 41 where it extends also in a clockwise direction around the ratchet and then upwardly having a top end affixed to the rear end portion of the platform. Wire 37b extends downwardly from the front end portion of the platform and around in a counterclockwise direction as viewed in FIG. 12 on ratchet 91 and then rearward around ratchet 40 in a counterclockwise direction having a top end affixed to the rear end portion of the platform. Thus, as the front end portion of the platform is forced downwardly, wires 37a and 37b move downwardly in the direction of arrows 93 around ratchets 90 and 91. The wires then extend rearwardly around ratchets 41 and 40 and upwardly to the rear end portion of the platform as the rear end portion moves upwardly. Ratchets 90 and 41 are disengaged as the front end portion of the platform moves downwardly whereas ratchets 91 and 40 are lockingly engaged with the wheel hubs mounted to wheels 31 and 33 rotating each wheel 31 and 33 in a counterclockwise direction propelling the scooter in the forward direction 56. The reverse is true as depicted in FIG. 13 wherein downward movement of the rear end portion of the platform causes ratchets 40 and 91 to be disengaged while ratchets 41 and 90 are engaged rotating the front wheel 31 and rear wheel 33 in a counterclockwise direction also propelling the scooter in a forward direction. As a result, the scooter is continually propelled in the forward direction regardless of whether the platform is moving so that the front end portion or the rear end portion of the platform are moving downward. Likewise, the embodiments shown in FIG. 13 provides a dual drive system in that the left side ratchets are engaged while the right hand rackets are disengaged and vise versa providing for a positive driving force on the front and rear wheel as the platform rocks back and forth.

Figure 14:
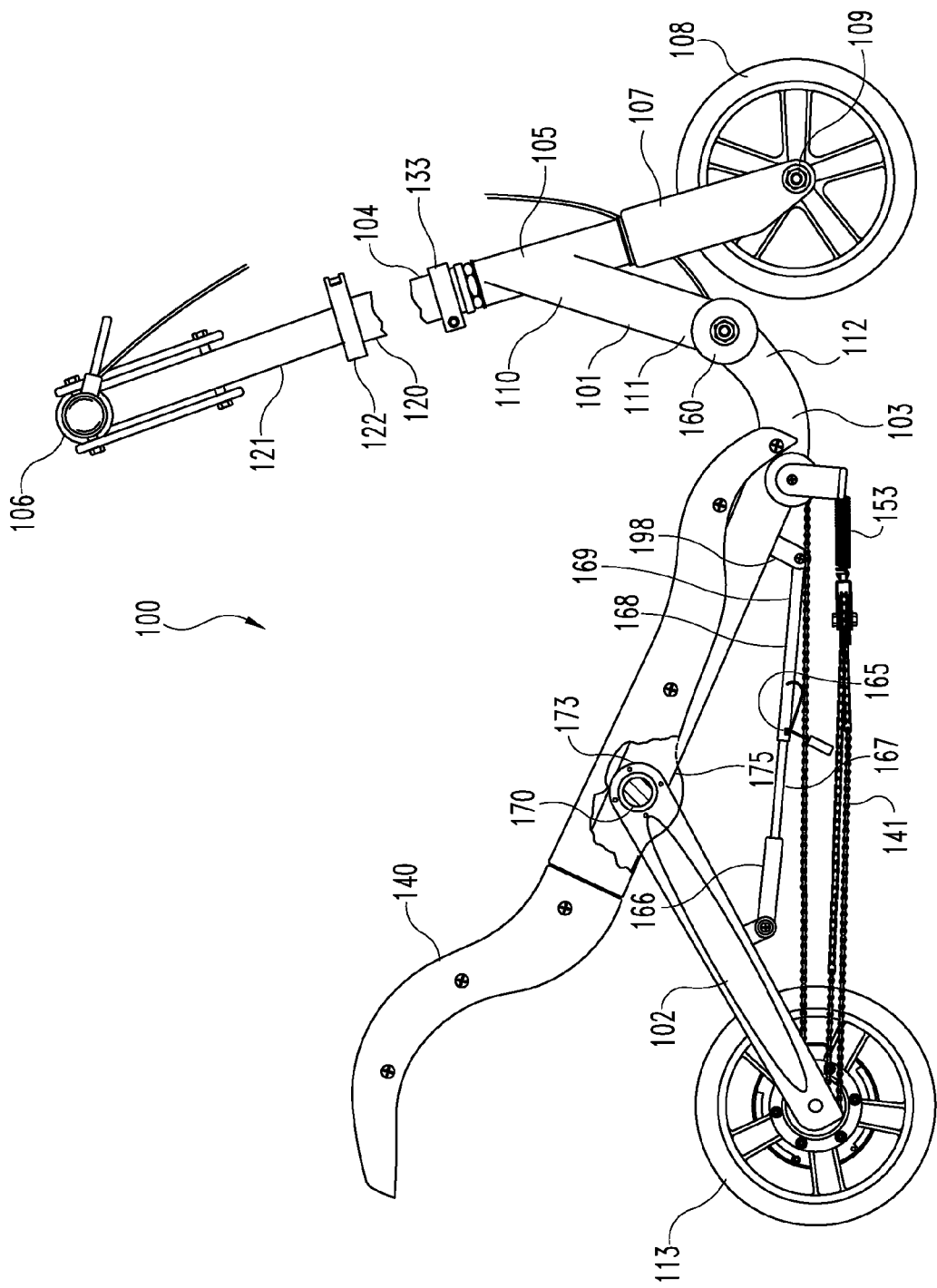
FIG. 14 is a side view of the preferred embodiment of the scooter having a foot operated mechanism that is collapsible for compact storage and/or use as a conventional scooter.

The preferred embodiment of the scooter is shown FIG. 14. Scooter 100 includes a frame 101 having a rear portion 102 and a front portion 103 with adjacent ends pivotally connected together. A handlebar 106 is fixedly mounted to the top end of a telescopic stem with the bottom end of stem 104 fixedly connected to an inverted u-shaped bracket 107. The inverted u-shaped bracket 107 includes a pair of downwardly extending arms between which is rotatably mounted the front wheel 108 by a conventional axle 109 and fasteners rotatably securing the axle to the downwardly extending legs of bracket 107. The inverted u-shaped bracket 107 includes an upwardly extending tubular portion rotatably received by hollow cylinder 105 and fixedly secured to the large diameter tube 120 of stem 104 by coupling 133 (FIG. 14) allowing rotation of stem 104 to direct wheel 109. Cylinder 105 includes a rearwardly extending leg 110 having a bottom end 111 pivotally mounted to the upwardly extending top end 112 of front portion 103 of frame 111. A rear wheel 113 is pivotally mounted to the mutually opposed ends of frame rear portion 102.

Figure 19:
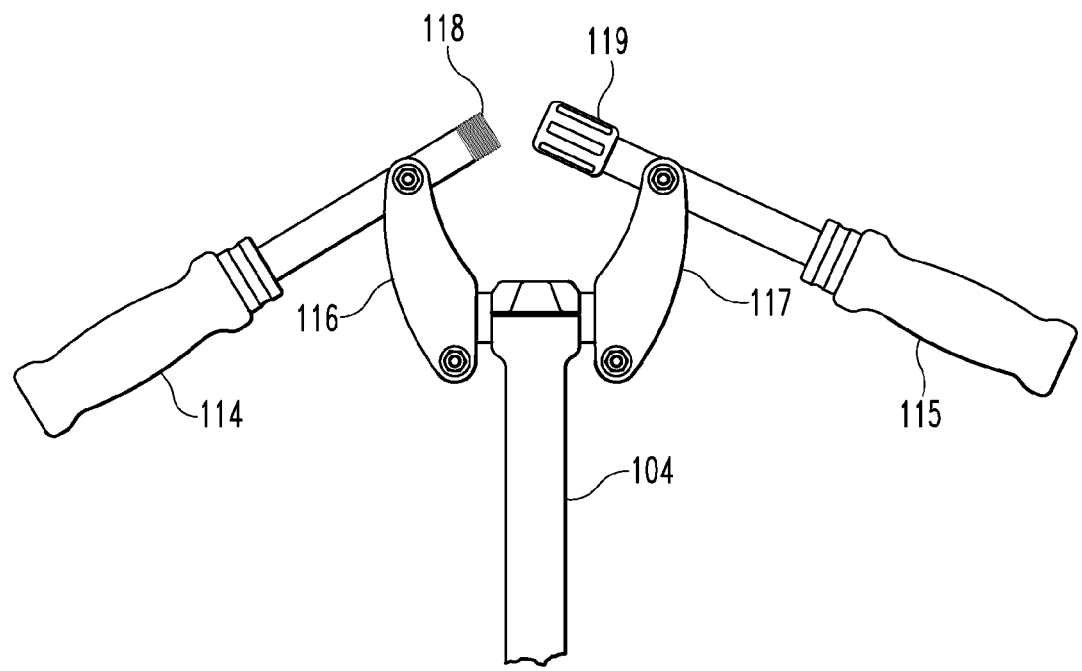
FIG. 19 is the same view as FIG. 18 only showing the left handlebar portion and the right handlebar portion separated.
Figure 20:
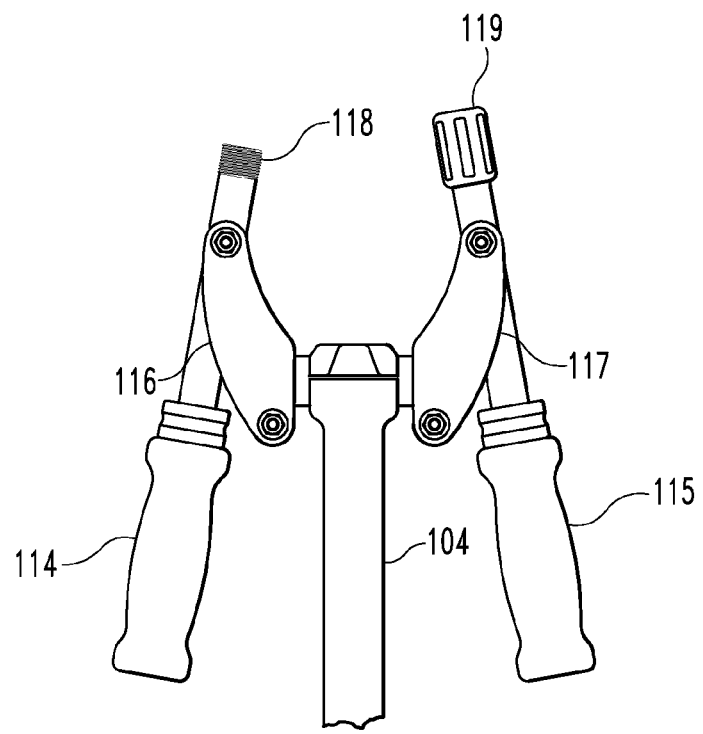
FIG. 20 is the same view as FIG. 19 only showing the left handlebar portion and right handlebar portion in a collapsed state.

Handlebar 106 may be collapsed to allow compact storage of the scooter. Handlebar 106 includes a left handlebar portion 114 (FIG. 18) and a right handlebar portion 115 each pivotally mounted respectively to a pair of upwardly extending arms 116 and 117 fixedly mounted to the top end of stem 104. End 118 (FIG. 19) of the left handlebar portion 114 has external threads formed thereon with end 118 insertable into the hollow internally threaded end 119 of right handlebar portion 115 when the handlebars are aligned and extend along a single longitudinal axis as depicted in FIG. 18. End 119 of right handlebar portion 115 is rotatably mounted to the right handlebar portion so that when end 118 is inserted into end 119, end 119 may be rotated to either loosen or securely fasten the ends together. In the end-use position, end 119 (FIG. 18) is rotated to securely fasten the end of left handlebar portion 114 securely to right handlebar portion 115. As end 119 is rotatable in the loosening direction, the left handlebar portion and right handlebar portion may be pivoted from the position of FIG. 18 to the position of FIG. 19 and eventually collapsed against stem 104 as shown in FIG. 20.

Figure 21:
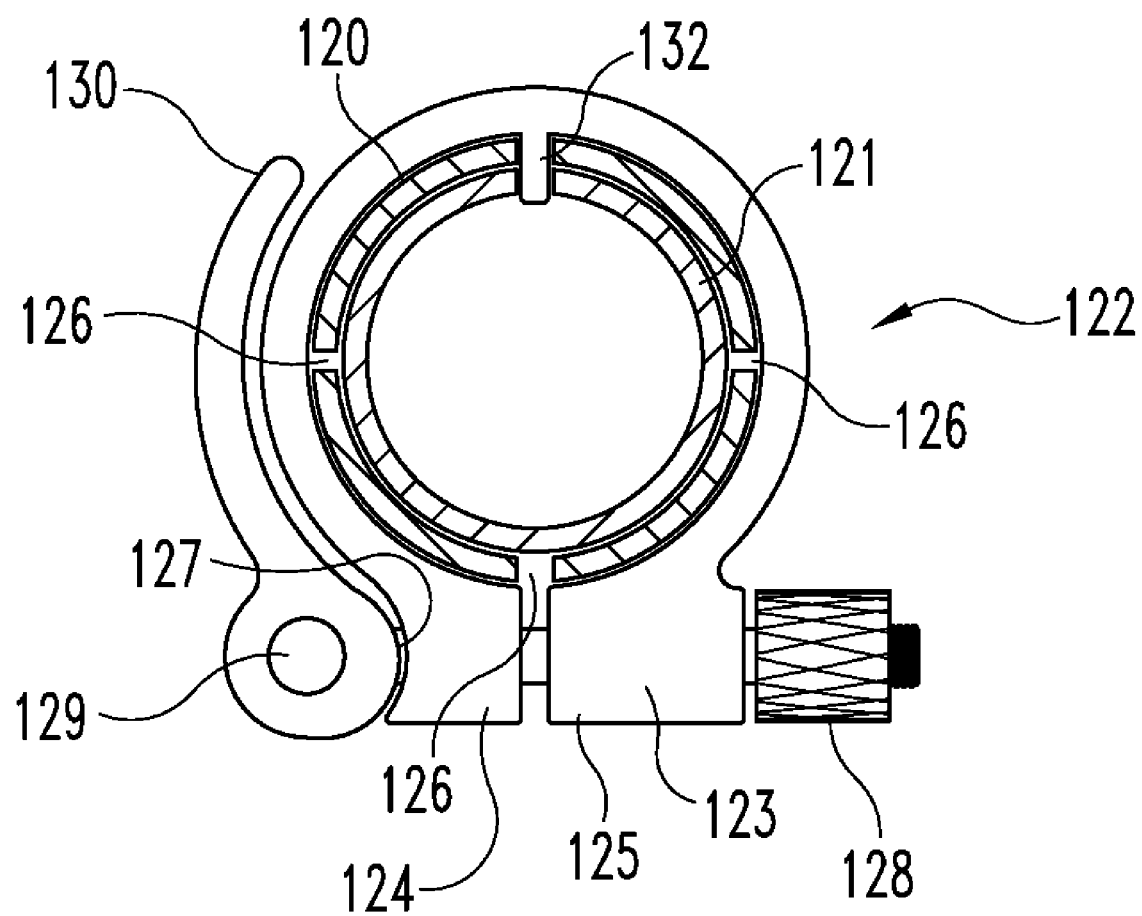
FIG. 21 is an enlarged cross-sectional view looking in the directions of arrows 21-21 of FIG. 17 illustrating the telescopic stem coupling.

Stem 104 (FIG. 14) includes a large diameter tube 120 slidably receiving a smaller diameter tube 121 providing for the telescopic construction. The large diameter tube 120 is shown fragmented in the drawings; however, it is to be understood that the tube 120 is a single piece. The top end of the smaller diameter tube 121 is fixedly fastened to handlebar 106. Coupling 122 is fixedly mounted to the top end of large diameter tube 120. Coupling 122 (FIG. 21) includes a clamp 123 having a pair of spaced apart arms 124 and 125 at one end of the clamp with the arms integrally joined together at the opposite end of the clamp forming a hole through which the small diameter tube 121 extends. The top end of the large diameter tube 120 includes a plurality of slots 126 that extend a short distance, approximately one-half inch along the length of tube 120 allowing tube 120 to restrict when the clamp 123 is closed thereby gripping tube 121. A threaded bolt 127 extends through ends 124 and 125 of the clamp having one end threadingly engaged with a internally threaded nut 128 whereas the opposite end 129 has pivotally mounted thereon a handle 130 that may be pivoted from the closed position depicted in FIG. 21 to an open position allowing ends 124 and 125 to separate with the inner-tube 121 then being slidably moved relative to tube 120 to the appropriate position locating the handlebars at the proper elevation for the rider. A longitudinally extending groove 131 (FIG. 17) extends along the length of inner-tube 121 to receive a finger or projection 132 (FIG. 21) integrally formed on clamp 123 and extending through tube 120 ensuring that tube 121 does not rotate relative to tube 120 thereby keeping the handlebars aligned with the stem.

Figure 24:
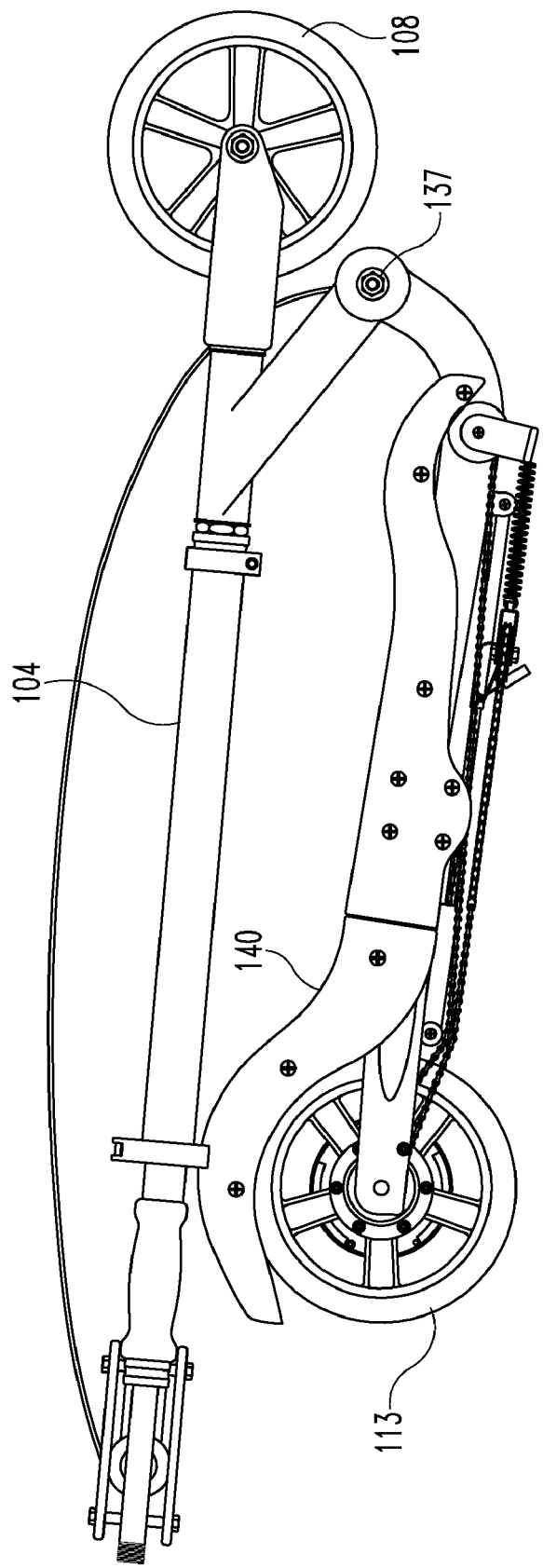
FIG. 24 is a side view of the scooter of FIG. 14 in a collapsed and compact position for storage.

The upwardly turned end 112 of front end 103 of the frame includes a disc shaped end 135 (FIG. 16) integrally joined thereby whereas the bottom end 111 of leg 110 includes a disc shaped end 134 integrally joined thereto. Ends 134 and 135 had mutually facing surfaces between which is positioned a conventional friction washer 136. A bolt 137 extends through ends 134 and 135 and has a handle 138 pivotally mounted thereto. The inner end of handle 138 is cam shaped so that when the handle is positioned flush against end 135, ends 134 and 135 are pulled together whereas with the handle extending perpendicularly outward from end 135, ends 134 and 135 are allowed to move apart thereby allowing the leg 110 with connected stem and front wheel to pivot downward towards the rocker platform 140 (FIG. 24).

Figure 23:
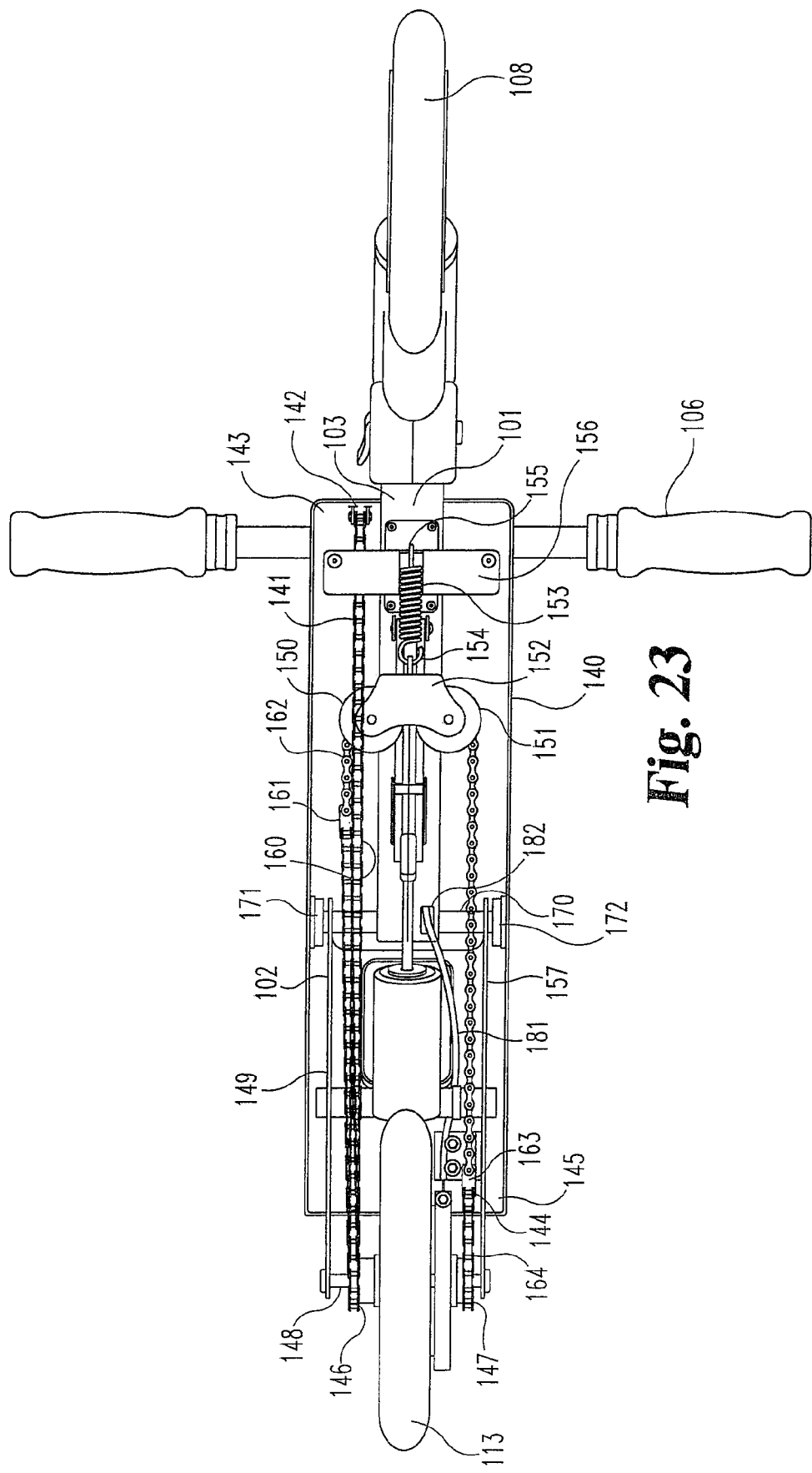
FIG. 23 is an enlarged bottom view of the scooter of FIG. 14.

Rocker platform 140 (FIG. 23) has a roller chain 141 with a first end 142 fastened to the bottom of the front 143 of platform 140 and an opposite end 144 fastened to the bottom of rear 145 of the platform. A pair of sprockets 146 and 147 are mounted to the opposite sides of rear wheel 113, in turn, rotatably mounted to axle 148. Axle 148 is mounted to a pair of spaced apart legs 149 and 157 forming the rear portion 102 (FIG. 23) of the frame. Ratchets 146 and 147 are identical to the ratchets 40 and 41 previously described. Each ratchet is operable to drive the rear wheel when rotated in a first direction or disengaged from the wheel when rotated in an opposite direction. Thus, by rotating one ratchet wheel in a first direction while rotating the other ratchet wheel in an opposite direction, wheel 113 is caused to rotate imparting forward movement to the scooter. Alternatively, by reversing the rotation of the two ratchet wheels, continued rotational force is applied to the wheel.

Ratchet wheels 146 and 147 are spaced apart by hub fixedly attached to the rear wheel of the scooter. The hub is rotatably mounted to the axle. The outer opposite ends of the hub form recesses or outer races into which the inwardly facing ends of the inner races are rotatably mounted as previously described and illustrated in FIGS. 3-5 of the prior art ratchets and hubs. Thus, ratchets 146 and 147 are identical to that previously described for the prior art scooter shown in FIGS. 2-7 with the exception that sprockets 146 and 147 include a plurality of outwardly extending radial teeth to releasably engage roller chain 141 as compared to a cable which may be extended around ratchets 40 and 41.

A pair of spaced apart wheels 150 and 151 are rotatably mounted to a bracket 152 suspended beneath rocker platform 140. A helical spring 153 has one end 154 attached to bracket 152 with the opposite end 155 of the helical spring fixedly mounted to bar 156, in turn, fixedly mounted to the bottom surface of the front end 103 of the scooter frame 101.

Lower chain 141 extends rearwardly to ratchet wheel 146. The roller chain extends approximately 180 degrees around ratchet wheel 146 and then extends in a forward direction around wheel 150. Wheel 150 has a plurality of outwardly extending radial teeth to releasably engage the roller chain. The roller chain extends approximately 90 degrees around wheel 150 thereby directing the roller chain across the bottom of the rocker platform to engage the outwardly extending radial teeth of wheel 151. The chain extends approximately 90 degrees around wheel 151 and then in a rearward direction to ratchet wheel 147. The chain then extends approximately 90 degrees around ratchet wheel 147 and upwardly towards the rear 145 of the rocker platform 140 where it is attached. Thus, the rocker platform and roller chain provide the same type of rocking and driving action as illustrated for the prior art scooter in the schematics of FIGS. 6 and 7 with the exception that the single pulley wheel 38 is replaced by a pair of wheels 150 and 151 and with the exception that the pulley wheels of FIG. 6 are replaced by wheels having outwardly extending radial teeth to engage the chain.

Ratchet wheels 146 and 147 extend generally in a vertical direction whereas wheels 150 and 151 extend generally in a horizontal direction. Thus, it is necessary to reorient the roller chain so that the chain engages all four wheels. Roller chain 141 has three separate roller chains joined together with the first roller chain section 160 extending from end 142 rearwardly around ratchet wheel 146 to linkage 161 wherein the first roller chain section is joined by linkage 161 to a second roller chain section 162 to engage wheels 150 and 151. Roller chain section 162 extends around ratchet wheels 150 and 151 to linkage 163 whereat roller chain section 162 is joined to a third roller chain 164. Roller chain sections 164 and 160 are oriented 90 degrees with respect to the middle roller chain 162 with the teeth of sprockets 146 and 147 extending freely through roller chain sections 160 and 164 whereas the outwardly extending radial teeth of wheels 150 and 151 extend freely through roller chain section 162.

Spring 153 (FIG. 23) provides a shock absorbing action as the scooter encounters irregular supporting surface, such as, holes in the pavement or rocks atop the supporting surface. The front end 103 and the rear end 102 of frame 101 are pivotally mounted at their top ends to enable the front end to pivot with respect to the rear end thereby requiring the spring 153 to take up the slack in the roller chain or allow the roller chain to move rearwardly to accommodate the pivoting action of the frame.

Rear end 175 of the front end portion 103 is pivotally mounted to rod 170 (FIG. 14). The rear end portion 102 comprised of a pair of spaced apart members 149 and 157 (FIG. 23) have their forward ends 173 pivotally mounted to the same rod 170. The opposite ends 171 and 172 of rod 170 are enlarged and are fixedly mounted to the rockable platform 140.

Platform 140 is fragmented in FIG. 14 in order to illustrate that the top or forward ends 173 of the pair of members 149 and 157 forming rear end frame portion 102 are pivotally mounted to rod 170. The top end 175 of front end portion 103 of the frame is positioned between the top ends of members 149 and 157 allowing the front end portion 103 of the frame and rear end portion 102 of the frame to pivot about rod 170 as necessitated by the scooter encountering rough terrain. Rockable platform 140 is fixedly mounted to rod 170 and is allowed to pivot with the rod relative to the frame 101.

The scooter has three separate positions. In the first position, the rockable platform 140 is in the upward position with the stem and handlebars in the erect position. Thus, a rider may place both feet atop the platform with one foot atop the front end of the platform forming a foot place and with the second foot positioned atop the rear of the platform forming another foot place. The platform may then be rocked as previously described for the prior art scooters enabling the scooter to be propelled in a forward direction both when the front end portion of the platform is moved downwardly while the rear end portion of the platform moves upwardly and when the rear portion of the platform moves downward and the front end portion of the platform moves upward. Such action is identical to the action described for the prior art scooter illustrated by the schematics of FIGS. 6 and 7.

Figure 15:
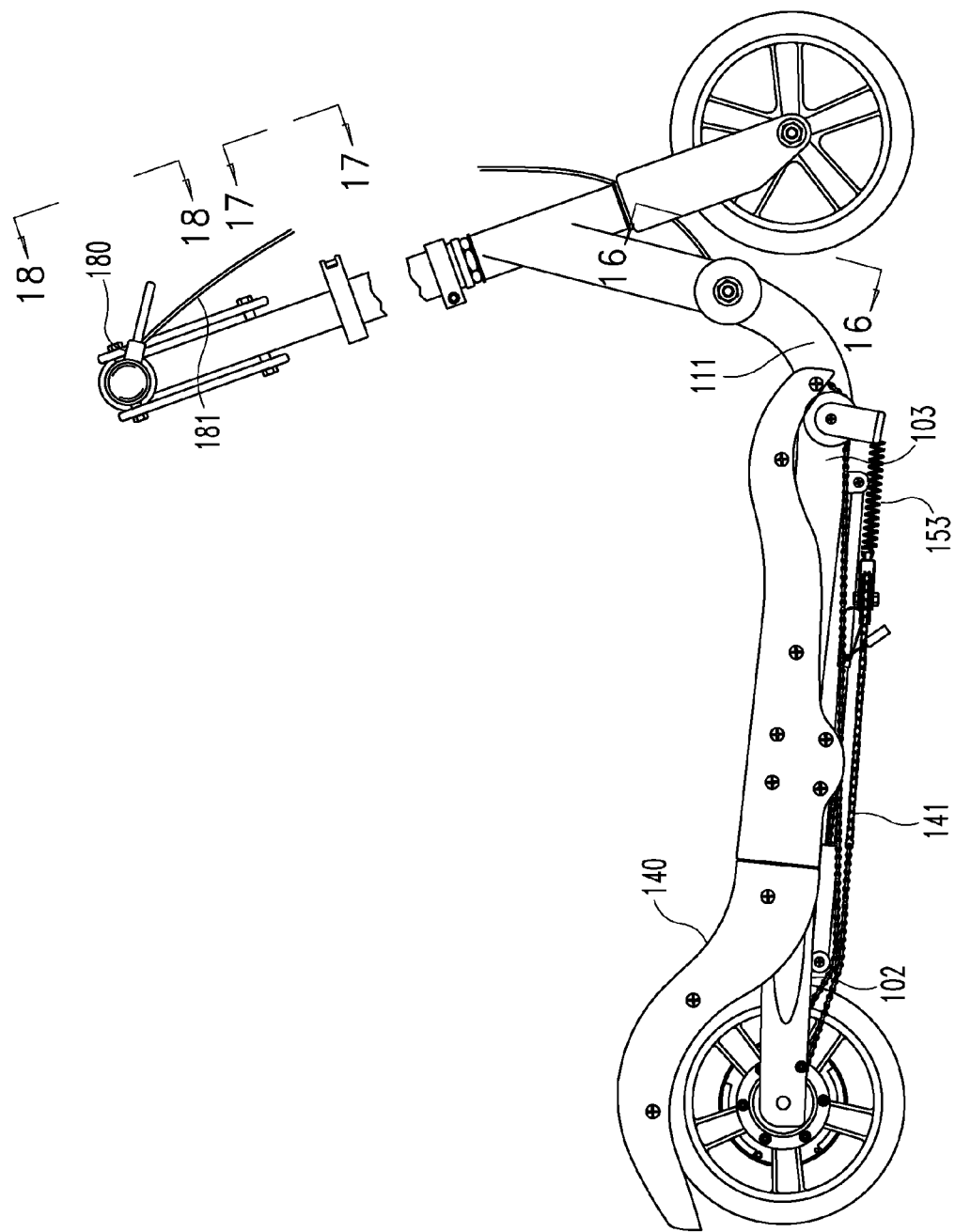
FIG. 15 is the same view as FIG. 14 only showing the rocker platform collapsed in a downward position against the frame for use of the scooter in a conventional manner.

The scooter may also be utilized in a second position, namely in the conventional mode shown in FIG. 15. In this mode, the platform 140 is collapsed atop frame 101 by pivoting end 173 of rear end frame portion 102 and end 175 of front end frame portion 103 downward. Both frame portions 102 and 103 are pivotally and connected together about rod 170. As front end frame portion 103 pivots downward, the stem 104 and handlebars also pivot rearward since leg 110 and hollow cylinder 105 are normally locked with respect to end 112 of frame portion 103 assuming coupling 160 is in the locked stationary position. Thus, stem 120 inclines slightly from the position of FIG. 14 to the position of FIG. 15. At the same time, helical spring 153 allows the chain to move rearwardly with the rear wheel 113. Platform 140 assumes a generally horizontal position allowing the person to place one foot on the platform while the other foot engages and pushes against the ground thereby propelling the scooter in a normal fashion.

A releasable lock 165 (FIG. 14) is operable to releasably lock the platform 140 in the upward position. Lock 165 (FIG. 25) includes a hollow cylinder 166 (FIG. 25) pivotally mounted at one end to rear frame portion 102 and has an extendable rod 167 with an enlarged end 171. The enlarged end 171 includes a recess or notch 199. End 171 is slidably received by tube 168 having an end 169 mounted by brackets 198 to front end frame portion 103. A removable pin 165 is mounted to tube 168 and is normally operable to lock end 171 relative to tube 168 and prevent further extension of end 171 into tube 168. In this position, the scooter is locked in the upper position whereat the platform is located apart from the scooter frame to allow the platform to be rocked back and forth. Once pin 165 is removed, the pin no longer contacts notch 199 of end 171 allowing end 171 to extend further into tube 168 thereby allowing the rear wheel to move further apart from the front wheel with the spring 153 extending in length allowing rearward movement of chain 141 and allowing rear end frame portion 102 to pivot downward to be aligned with front end frame portion 103 as the stem 104 and handlebars incline slightly more to the rear as compared to the position of FIG. 14.

The third position of the scooter is illustrated in FIG. 24 and is the position the scooter assumes for storage purposes. The left handlebar and right handlebar are collapsed against the stem as previously described and illustrated in FIG. 20. Coupling 122 is released allowing extension of the small diameter stem tube 121 into the large diameter tube 120. At the same time, coupling 160 is released allowing leg 110 and stem 104 to pivot in a counterclockwise direction as viewed in FIG. 15 until the handlebars and stem rest atop the platform as illustrated in FIG. 24. In this position, the front wheel 108 assumes an upward position.

Figure 22:
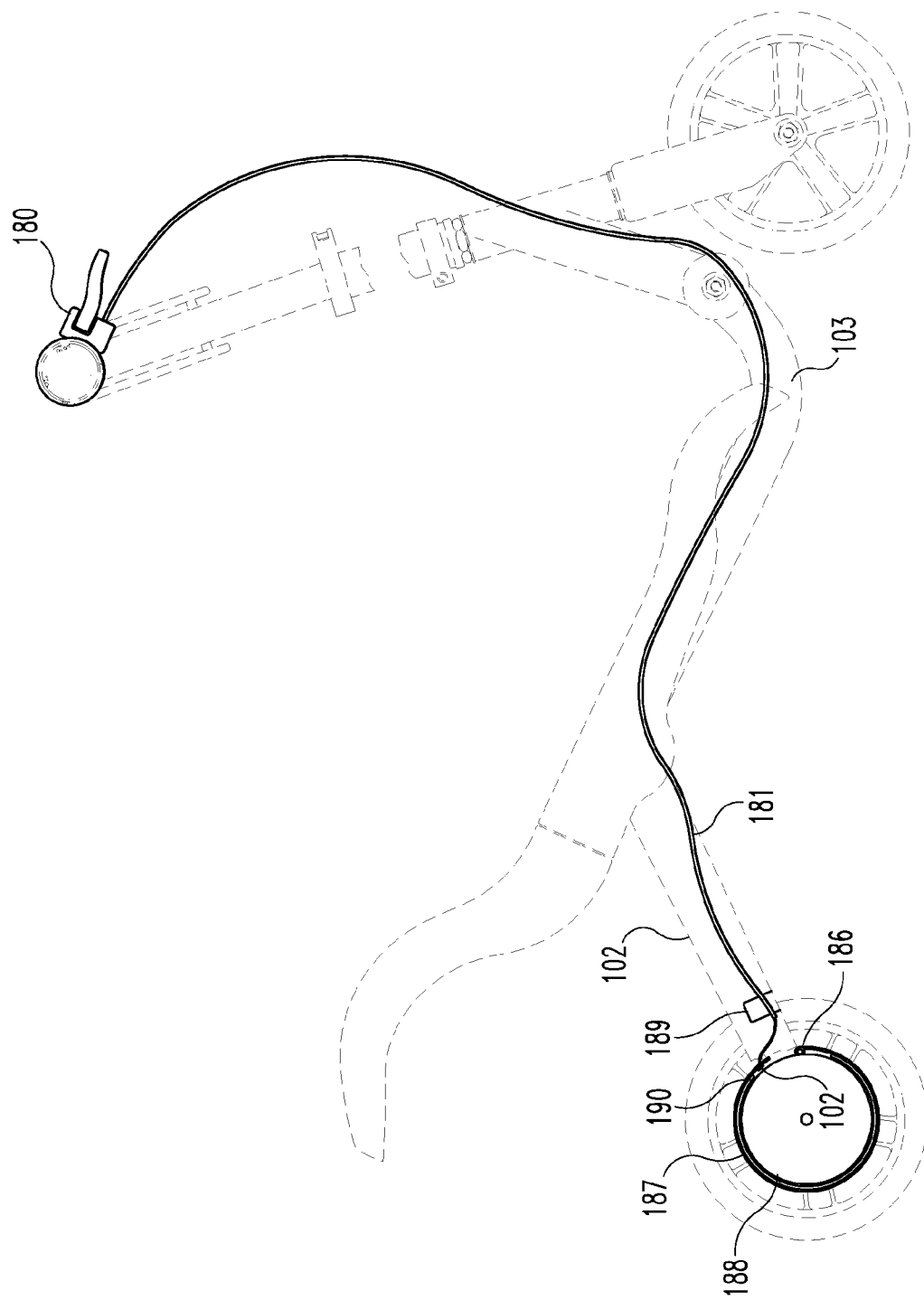
FIG. 22 is a schematic view of the brake handle and cable connected to the rear brake shoe.

Scooter 100 includes a conventional hand brake 180 (FIG. 22) mounted to the view to the left or right handlebar portion. The brake includes a squeezable handle connected to a cable 181 that extends downwardly and then through a hole (not shown), in the front end frame portion 103 with the cable extending through the hollow interior of front end frame portion 103 with the cable then exiting via hole 182 (FIG. 23) in the trailing end of front end frame portion 103. The cable terminates and is attached to the upper free end 190 of brake shoe 187 extending wrappingly around wheel hub 188. The outer sheath of the cable is fixedly secured by bracket 189 to rear frame portion 102. The opposite end 186 of brake shoe 187 is fixedly mounted to frame member 102. Thus, by squeezing handle 180, the cable is caused to retract pulling on end 190 and forcing brake shoe 187 against the wheel hub providing a braking action.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A scooter for a person that may be propelled in a forward direction both in a first position by pushing a first foot of the person against the ground while resting a second foot atop the scooter and in a second position by placing and rocking the first foot and the second foot atop the scooter comprising:
a frame having a first end portion and an opposite second end portion;
a first wheel rotatably mounted to said first end portion of said frame;
a second wheel rotatably mounted to said second end portion of said frame;
a platform with a front end portion to support a first foot of a person riding the scooter and a rear end portion to support a second foot of the person with said platform movably mounted to said frame between said front end portion and said rear end portion, said platform having a non-rockable position relative to said frame to receive said first foot atop said platform while the second foot engages the ground to propel the scooter and a rockable position releasably lockable in position relative to said frame allowing rocking motion therebetween to receive both said first foot and said second foot thereatop to rock said platform and propel the scooter;
releasable locking means connected to said frame to allow said platform to move from said non-rockable position to said rockable position and back and to releasably lock said platform in said rockable position;
ratchet means; and,
first connecting means connected to said front end portion of said platform and said ratchet means and said rear end portion of said platform and being operable to propel said scooter in a forward direction when said platform is rocked both by moving said front end portion upwardly and said rear end portion upwardly.

2. The scooter of claim 1 wherein:
said ratchet means includes:
a first ratchet mounted to said second wheel;
a second ratchet mounted to said second wheel; and wherein,
said first ratchet and said second ratchet are mounted on opposite sides of said second wheel which is a rear wheel,
said connecting means is engaged with said first ratchet and said second ratchet and is operable to rotate said second wheel to propel said scooter in a forward direction,
said connecting means includes a first roller chain and a second roller chain with one end of said first roller chain attached to said front end portion of said platform and an opposite end attached to one end of said second roller chain which is attached to said rear end portion of said platform, said first roller chain extends from said front end portion around said first ratchet and said second roller chain extends around said second ratchet.

3. The scooter of claim 2 wherein:
said frame includes a front frame and a rear frame pivotally joined together about a pivot axis with said platform pivotally mounted about said pivot axis, said front frame and said rear frame have an upward position corresponding to when said platform is in said rockable position with said front wheel and said rear wheel located apart a first distance, said front frame and said rear frame pivot down to a lower position corresponding to when said platform is in a non-rockable position with said front wheel and said rear wheel located apart a second distance greater than said first distance.

4. The scooter of claim 3 and further comprising:
a guide wheel on said frame to direct said connecting means from said first ratchet to said second ratchet, and,
a spring device mounted to said front frame, said spring device mounting said guide wheel to said front frame and having said connecting means extend thereon and to pull said guide wheel to maintain tension in said connecting means both when said platform is in said rockable position and said front wheel is spaced from said rear wheel said first distance and when said platform is in said non-rockable position and said front wheel is spaced from said rear wheel said second distance and further to main tension in said connecting means when said first wheel and said second wheel encounter rough terrain.

5. The scooter of claim 3 wherein:
said platform is pivotally mounted to said frame and is collapsible downwardly thereagainst to be compact for storage, said front frame has an erect position when said platform is in said rockable position but moves to a less erect position when said platform is in said non-rockable position.

6. A scooter comprising:
a frame having a first end portion and a second end portion movably inter-connected together, said frame further having an upwardly extending guide stem to grasp and guide the scooter;
a first wheel rotatably mounted to said first end portion of said frame;
a second wheel rotatably mounted to said second end portion of said frame;
a support pivotally mounted to said first end portion and said second end portion and having a first foot place movably mounted to said frame to support a foot of a person riding the scooter and a second foot place movably mounted to said frame to support another foot of the person;
a pair of independently rotatable ratchet wheels mounted to said second wheel with said second wheel located therebetween, each of said ratchet wheels when rotated in a rotational direction being drivingly connected to said second wheel to rotate said second wheel and propel said scooter in a forward direction; and,
a line connected to said first foot place and one of said ratchet wheels to only drivingly rotate one ratchet wheel as said first foot place moves and connected to said second foot place and the other ratchet wheel to only drivingly rotate the other ratchet wheel as said second foot place moves in alternative fashion with said first foot place causing uninterrupted forward movement of the scooter and wherein:
said support is pivotally mounted to said frame and has an elevated position for the support to receive both feet of the person rocking said support to drivingly move the scooter and having a lowered position wherein said support receives one foot of the person while the other foot of the person engages ground and pushes the scooter to drivingly move the scooter; and,
said first wheel is located from said second wheel a distance greater when said support is in said lowered position than when in said elevated position.

7. The scooter of claim 6 wherein:
said support is a platform to receive both feet of the person riding the scooter, said platform has said line which includes a roller chain located therebeneath, said line extends from said first foot place located forwardly on said platform back to one of said ratchet wheels and to the other of said ratchet wheels and then to said second foot place located rearwardly on said platform; and further comprising:
- a guide wheel mounted to said frame having said line extending thereon between said ratchet wheels with said guide wheel moving rearwardly as said first wheel and said second wheel move further apart when said platform moves from said elevated position to said lowered position maintaining tension in said line.

8. The scooter of claim 7 and further comprising a upwardly extending telescopic stem with a collapsible handle shaped top end, said stem is pivotably mounted to said frame and collapsible there atop for compact storage, said first wheel is located forwardly of said platform beneath said stem, said stem moves downwardly to an inclined position when said platform moves from said elevated position to said lowered position; and,
- a spring mounting said guide wheel to said front frame and having a first position when said platform is in said elevated position and a second position when said platform is in said lowered position.

9. The scooter of claim 1 wherein:
said releasable locking means includes a telescopic device with opposite ends connected respectively to said first end portion and said second end portion, said telescopic arm is extendable from a short length locking said platform in said rockable position to a long length whereat said platform is in said non-rockable position.

10. The scooter of claim 9 and further comprising:
a guide mounted to said frame and located between said first wheel and said second wheel receiving said first connecting means, said guide is movably mounted to said frame and is movable rearwardly to allow said second wheel with ratchet means mounted thereon to move further apart from said first wheel.

11. A scooter comprising:
a main frame having a front frame and a rear frame with end portions movably connected together;
wheels including a front wheel rotatably mounted to said front frame and a rear wheel rotatably mounted to said rear frame;
a ratchet mechanism mounted to one of said wheels;
an upwardly extending stem on said front frame with a handle bar located thereatop;
a foot platform pivotably mounted to said end portions of said front frame and said rear frame, said foot platform having a front portion and a rear portion, said foot platform having an elevated rockable position wherein said platform can rock on said end portions and a lower position wherein said platform does not rock and is stationary relative to said front frame and said rear frame, said front wheel being spaced apart from said rear wheel a first distance when said platform is at said elevated rockable position and a distance greater than said first distance when said platform is at said lower position;
a drive line with opposite ends attached to said front portion of said platform and said rear portion of said platform and engaged with said ratchet mechanism;
a guide wheel movably mounted to said frame with said line guided thereby between said front wheel and said rear wheel; and,
a spring device mounted to said frame and connected to said guide wheel maintaining tension in said drive line when said front wheel and said rear wheel are spaced apart said first distance and when spaced apart said distance greater than said first distance.

12. The scooter of claim 11 and further comprising:
a lock attached to said front frame and said rear frame locking said platform in said elevated rockable position, said lock extends to allow said front frame and said rear frame to pivot spacing said front wheel from said rear wheel a distance greater than said first distance.

13. The scooter of claim 12 wherein said stem is a part of said front frame and moves inclinedly downward as said front frame and said rear frame pivot and said front wheel and rear wheel move to a distance apart greater than said first distance.

14. The scooter of claim 13 wherein:
said ratchet mechanism includes a first ratchet and a second ratchet, said drive line includes a first roller chain and a second roller chain with one end of said first roller chain attached to said front portion of said platform and an opposite end attached to said second roller chain attached to said rear end of said platform, said first roller chain extends from said front portion around said first ratchet and said second roller chain extends around said second ratchet.

* * * * *